United States Patent [19]

Huang

[11] Patent Number: 5,472,620
[45] Date of Patent: Dec. 5, 1995

[54] SOLID-LIQUID SEPARATION PROCESS USING AT LEAST ONE POLYMER AND CAVITATION ENERGY

[75] Inventor: Pin Y. Huang, Bellaire, Tex.

[73] Assignee: Exxon Production Research Company, Houston, Tex.

[21] Appl. No.: 402,761

[22] Filed: Mar. 10, 1995

Related U.S. Application Data

[63] Continuation of Ser. No. 126,155, Sep. 23, 1993, abandoned.
[51] Int. Cl.$^6$ .............................. B03B 1/00; B01D 43/00
[52] U.S. Cl. .......................... 210/748; 210/744; 210/787; 208/188; 208/302
[58] Field of Search .................................. 204/186, 188, 204/302; 210/748, 749, 787

[56] References Cited

U.S. PATENT DOCUMENTS

| | | | |
|---|---|---|---|
| 2,257,997 | 10/1941 | Barnes | 252/349 |
| 2,766,881 | 10/1956 | Westervelt et al. | 209/138 |
| 3,711,392 | 1/1973 | Metzger | 210/748 |
| 3,882,732 | 5/1975 | Fletcher et al. | 73/505 |
| 4,013,552 | 3/1977 | Kreuter | 210/748 |
| 4,055,491 | 10/1977 | Porath-Furedi | 210/19 |
| 4,307,964 | 12/1981 | Dudgeon et al. | 366/127 |
| 4,316,734 | 2/1982 | Spinoza | 65/21 |
| 4,339,247 | 7/1982 | Faulkner et al. | 55/15 |
| 4,661,226 | 4/1987 | Mintz et al. | 210/748 |
| 4,759,775 | 7/1988 | Peterson et al. | 55/15 |
| 5,202,032 | 4/1993 | Shoemaker | 210/718 |

FOREIGN PATENT DOCUMENTS

| | | | |
|---|---|---|---|
| 84307496 | 10/1984 | European Pat. Off. | B03B 1/00 |
| 85304806 | 7/1985 | European Pat. Off. | B03B 1/00 |
| PCT/GB88/00849 | 10/1988 | WIPO | B01J 19/10 |

OTHER PUBLICATIONS

Apfel, R. E., "Acoustic Radiation Pressure–Principles and Application to Separation Science", in *Fortschrittee der Akustik, DAGA*, 1990, pp. 19–35.
Beard, R. E., and Muralidhara, H. S., "Mechanistic Consideration of Acoustic Dewatering Techniques", in *1985 Ultrasonics Symposium*, pp. 1072–1075.
Benes, E., Hager, F., Boleck, W., and Groschl, M., "Separation of Dispersed Particles by Drifting Ultrasonic Resonance Fields", in *Proc. of Ultrasonics International Conference*, Le Touquet, France, Jul. 1–4, 1991.
Crum, L. A., "Acoustic Force on a Liquid in an Acoustic Stationary Wave", in *The Journal of the Acoustical Society of America*, vol. 50, No. 1, Part 2, 1971, pp. 157–163.
Crum, L. A., "Bjerknes Forces on Bubbles in a Stationary Sound Field", in *The Journal of Acoustical Society of America*, vol. 57, No. 6, Part 1, Jun. 1975, pp. 1363–1370.
Doktycz, S. J., and Suslick, K. S., "Interparticle Collisions Driven by Ultrasound", in *Science*, vol. 247, Mar. 2, 1990, pp. 1067–1069.
Higashitani, K., Fukushima, M. and Matsuno, Y., "Migration of Suspended Particles in Plane Stationary Ultrasonic Field", in *Chemical Engineering Science*, vol. 36, No. 12, 1981, pp. 1877–1882.
Hutchinson, J. M., and Sayles, R. S., "The Application of Ultrasonic Standing Waves to Particle Filtration", in *Ultrasonics International 87 Conference Proceedings*, pp. 302–307.
Schram, C. J., and Rendell, M., "Manipulation of Particles in Megahertz Standing Waves", in *Ultrasonics International 89 Conference Proceedings*, pp. 262–267.
Senapti, N., Muralidhara, H. S., and Beard, R., "Ultrasonic Interactions in Electro Acoustic Dewatering", in *British Sugar plc, Technical Conference, Eastborne*, 1988.
Senapti, N., "Scaling Up Ultrasinically Enhanced Processes", in *Ultrasonics International 89 Conference Proceedings*, pp. 236–243.
Suslick, K. S., and Doktycz, "The Sonochemistry of Zn Powder", in the *Journal of American Chemical Society*, 1989, pp. 2342–2344.
Suslick, K. S., "Origin of Sonoluminescence and Sonochemistry", in *Ultrasonics 1990*, vol. 28, Sep., pp. 279–290.
Tolt, T. L., and Feke, D. L., "Analysis and Application of Acoustics to Suspension Processing" in *Proc. of the 23rd Intersociety Energy Conversion Eng. Conference*, pp. 327–331.
Tolt, T. L., Feke, D. L., "Separation of Dispersed Phases from Liquids in Acoustically Driven Chambers", in *Chemical Engineering Science*, vol. 48, 1993, No. 3, pp. 527–540.
Whitworth, G., Grundy, M. A., and Coakly, W. T., "Transport and Harvesting of Suspended Particles Using Modulated Ultrasound", in *Ultrasonics 1991*, vol. 29, Nov., pp. 439–444.

*Primary Examiner*—Robert A. Dawson
*Assistant Examiner*—David Reifsnyder
*Attorney, Agent, or Firm*—Kelly A. Morgan

[57] ABSTRACT

A process for separating solids from a fluid using at least one polymer and acoustic energy at or above cavitation is disclosed. The fluid containing the polymer is flowed into a vessel and acoustic energy is applied to the fluid at intensity sufficient to induce cavitation within the fluid. At least a portion of the solids are allowed to agglomerate in at least one position within the vessel. The agglomerated solids are then separated from the fluid.

6 Claims, 16 Drawing Sheets

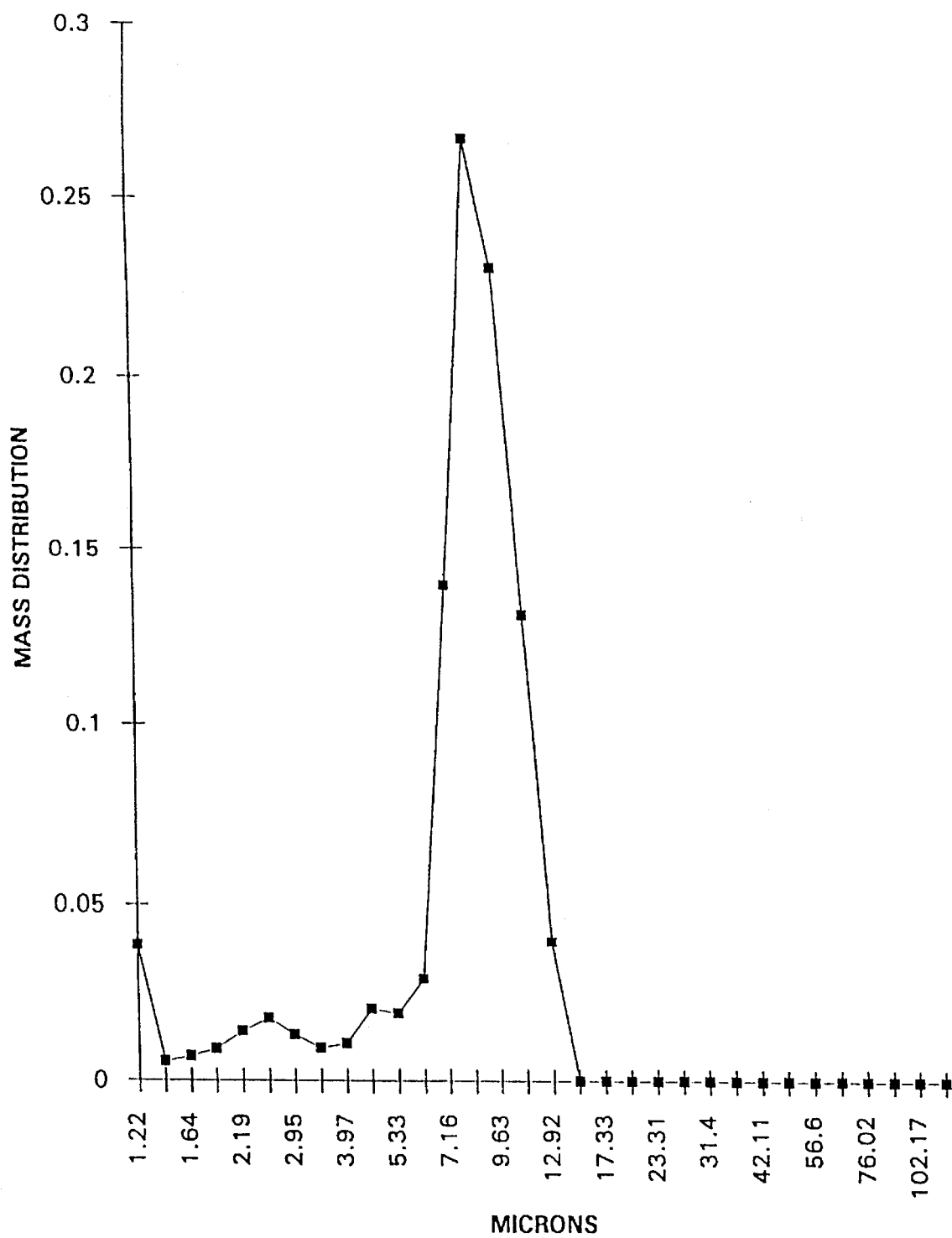
FIGURE 5 - GEL FLUID (SAMPLE #9-CONTROL)

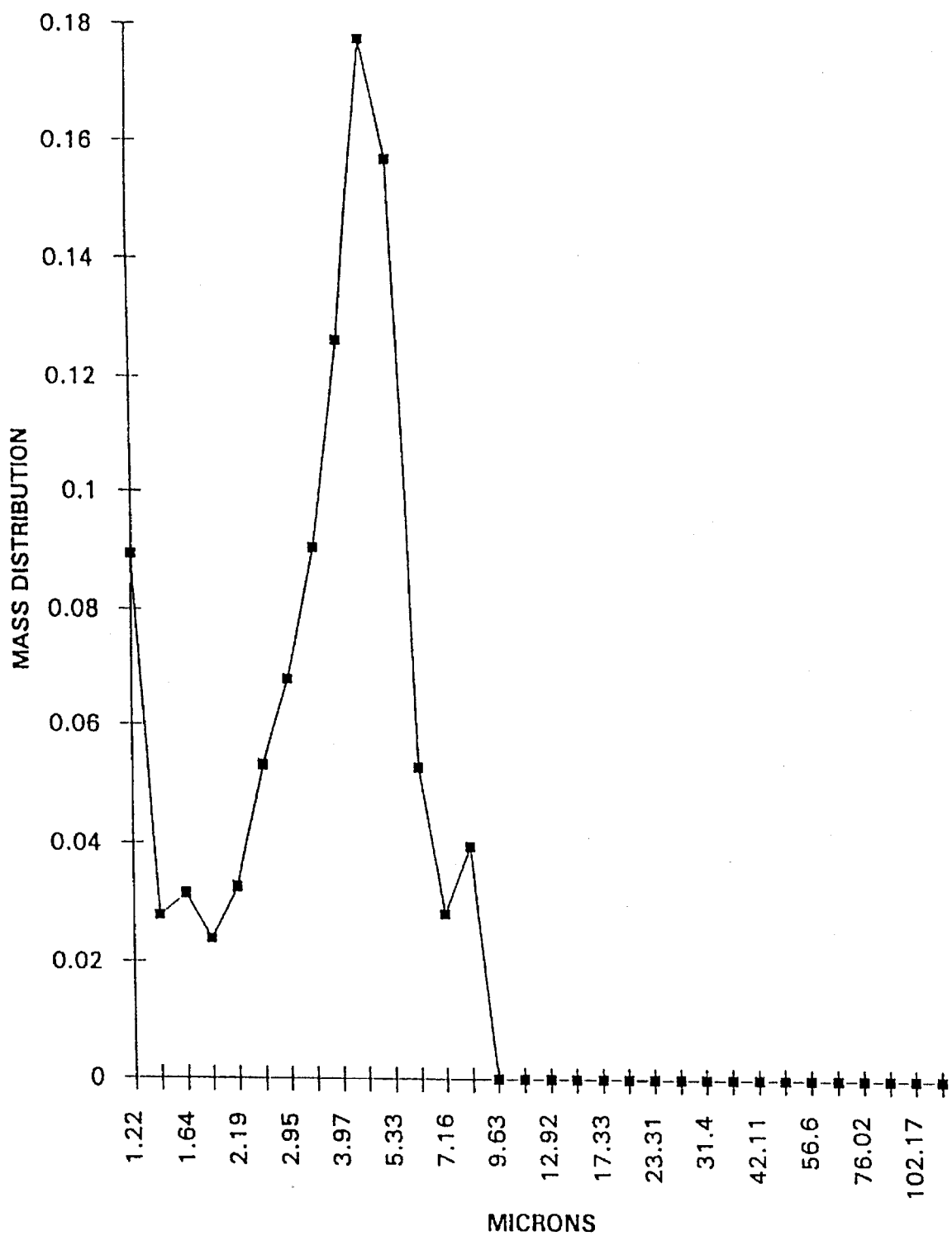
FIGURE 6 - GEL FLUID (SAMPLE #10)

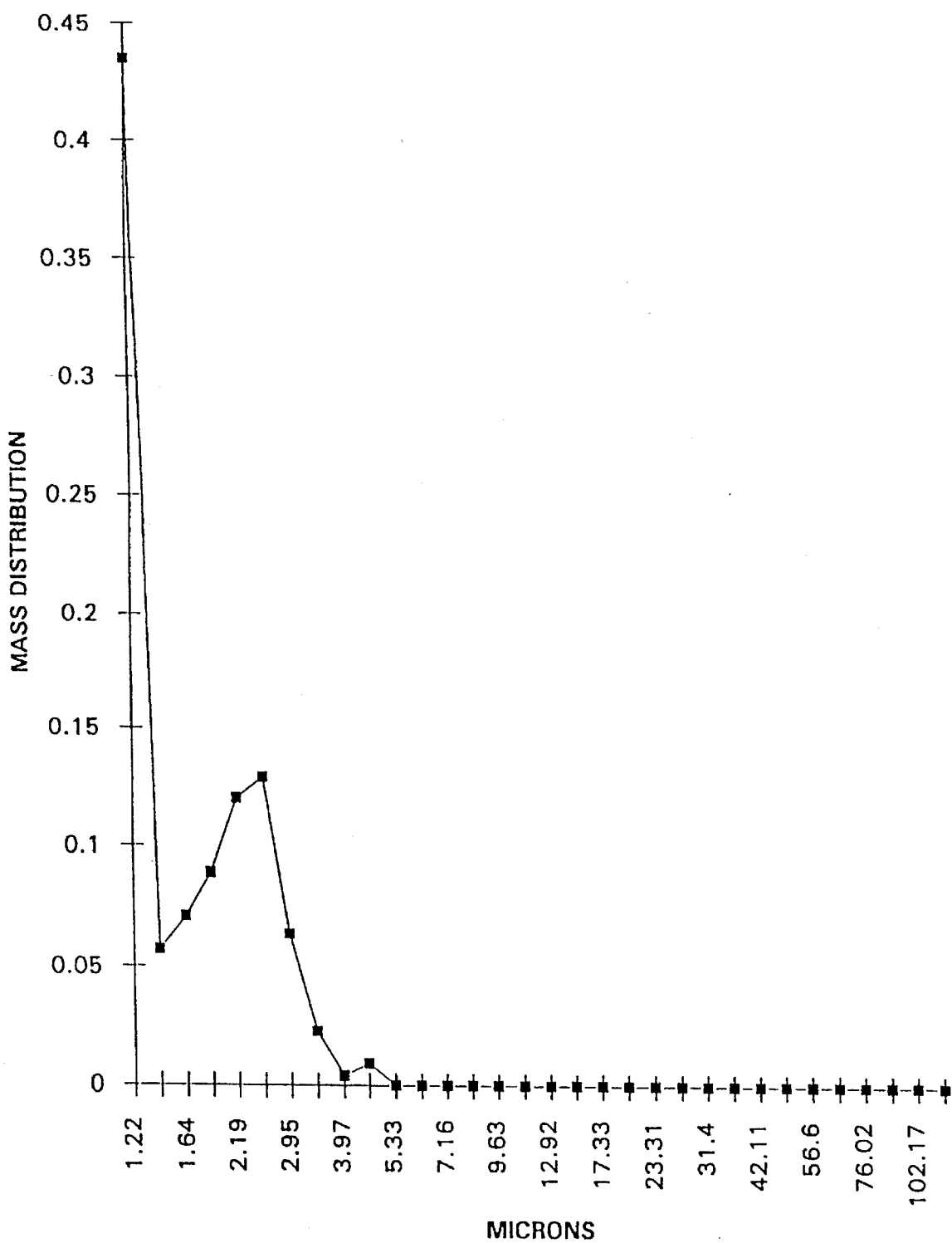
FIGURE 7 - GEL FLUID (SAMPLE #11)

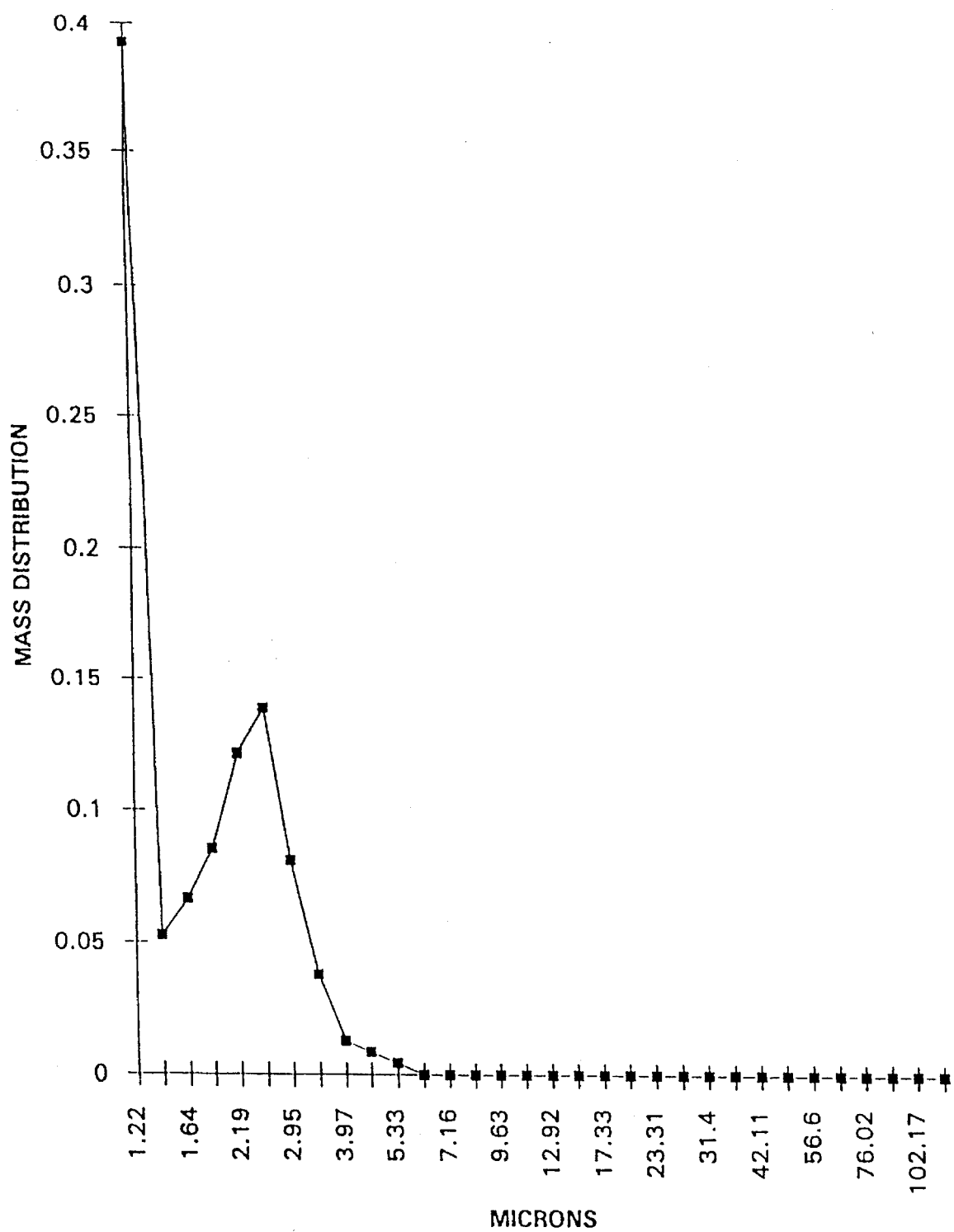
FIGURE 8 - GEL FLUID (SAMPLE #12)

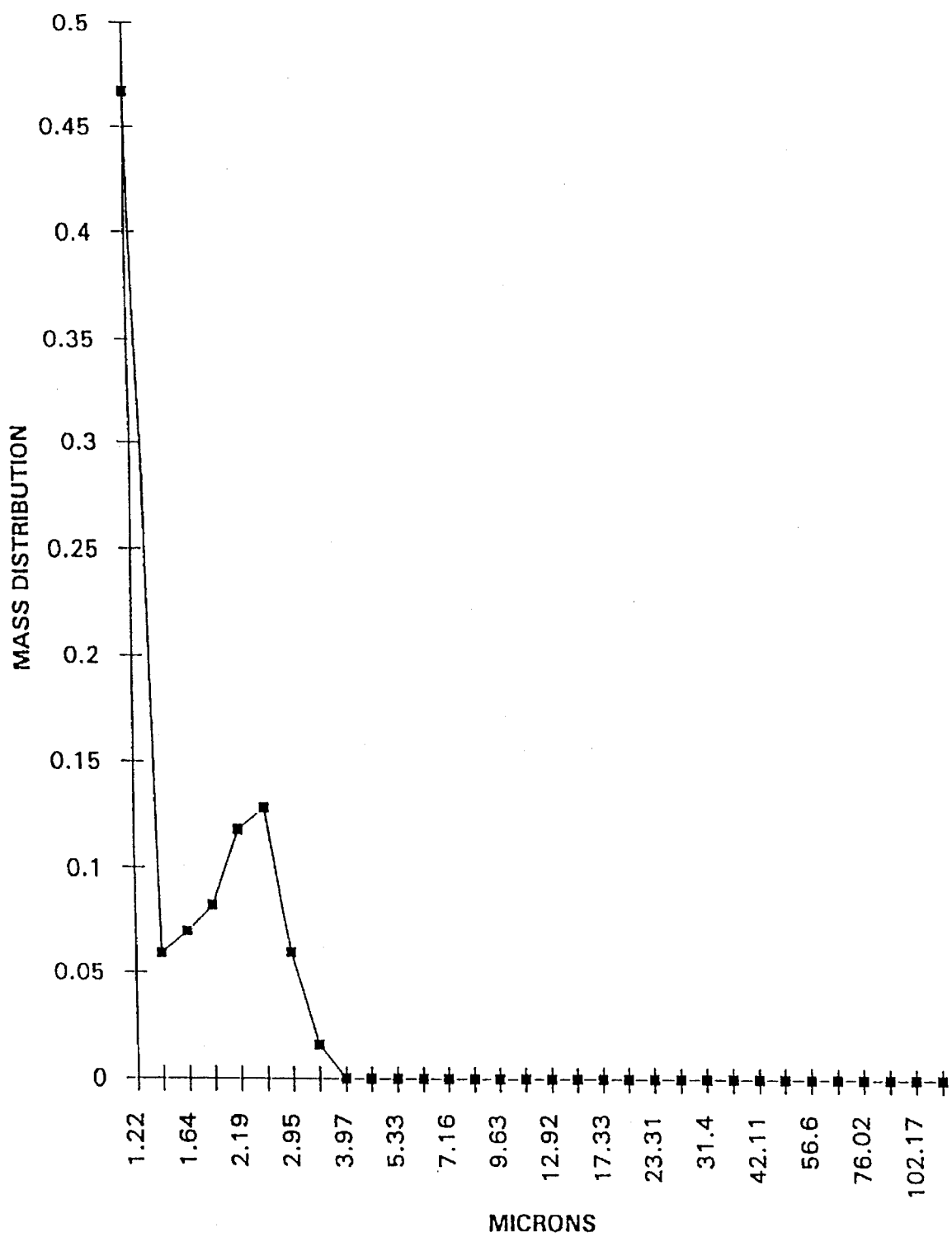
FIGURE 9 - GEL FLUID (SAMPLE #13)

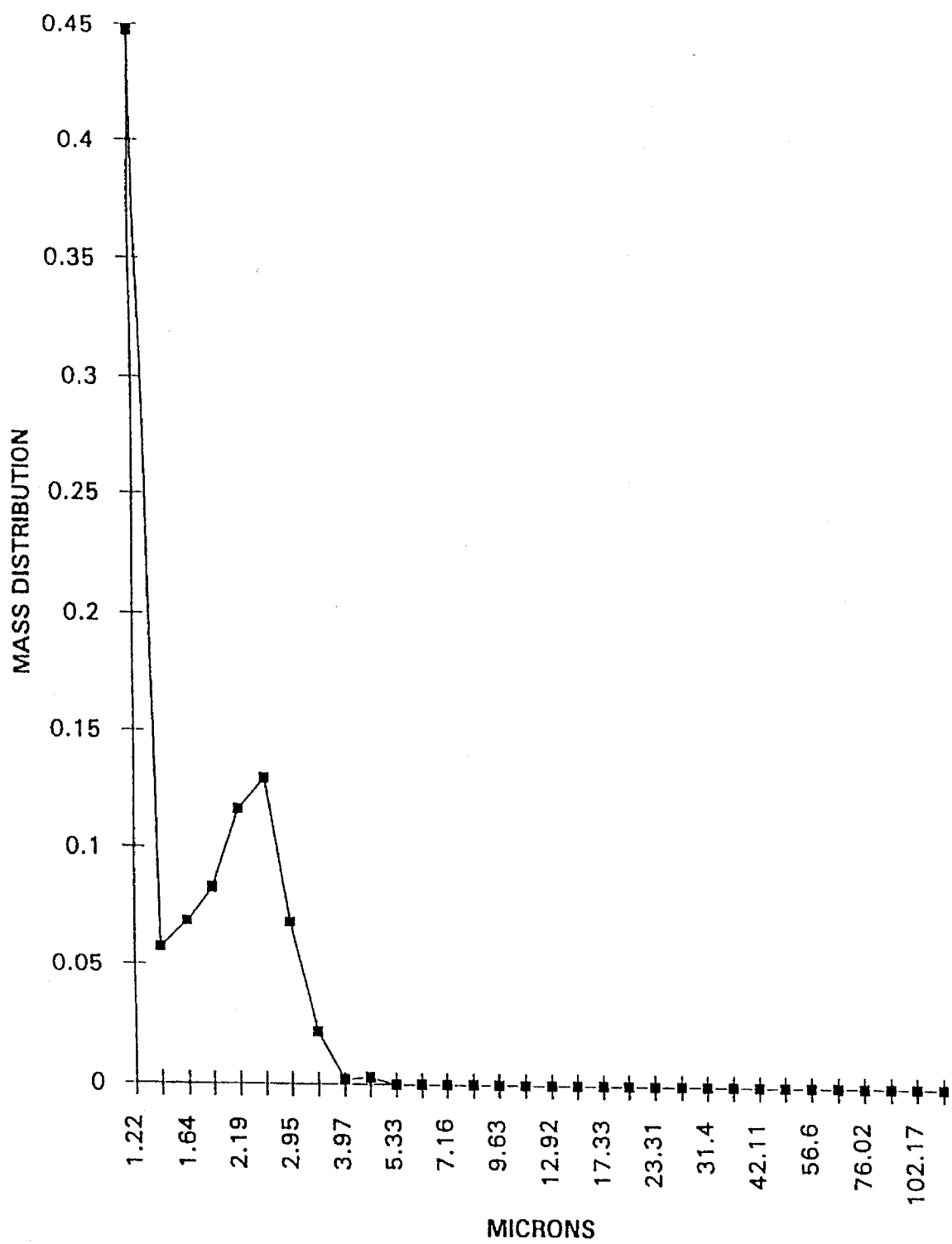
FIGURE 10 - GEL FLUID (SAMPLE #14)

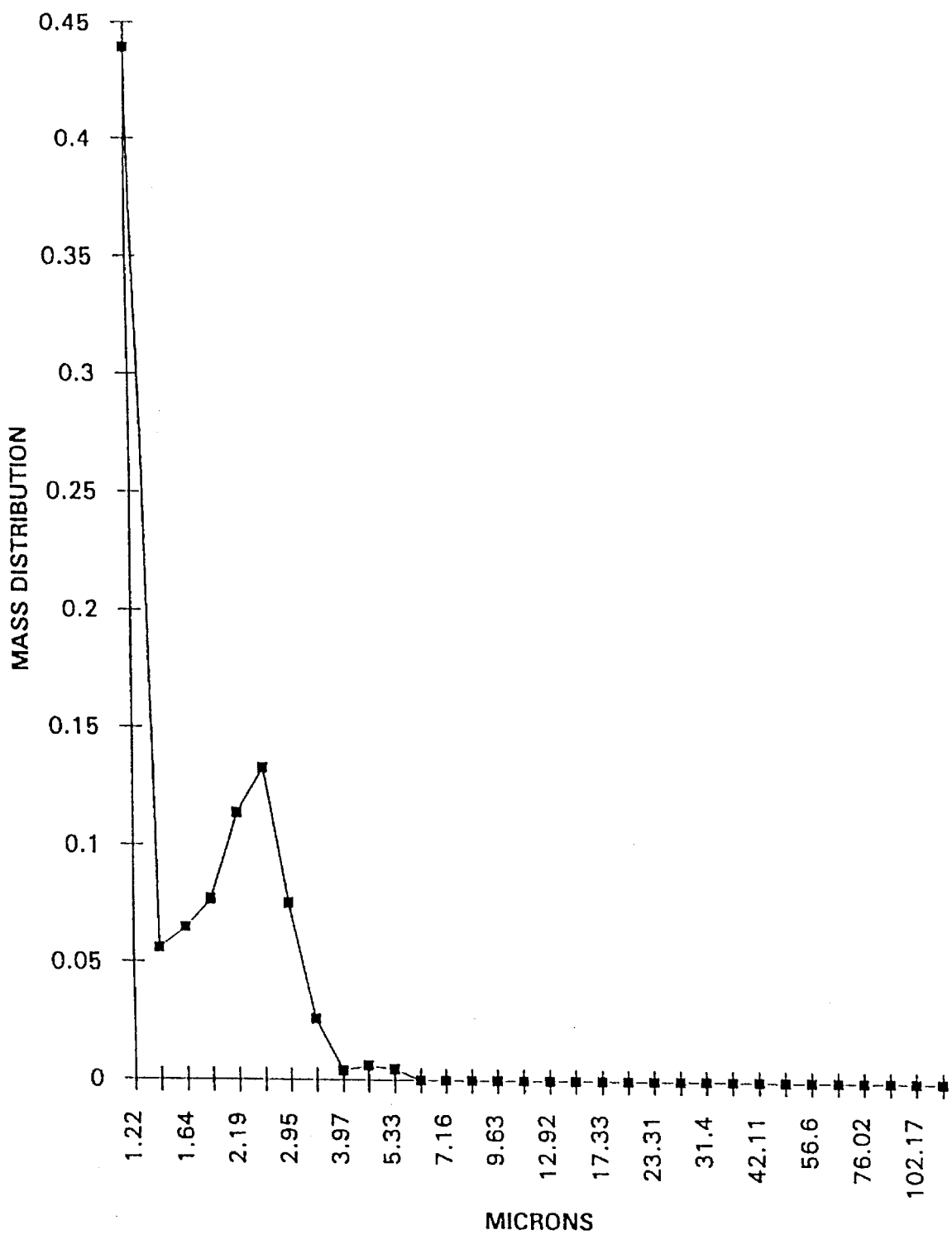
FIGURE 11 - GEL FLUID (SAMPLE #15)

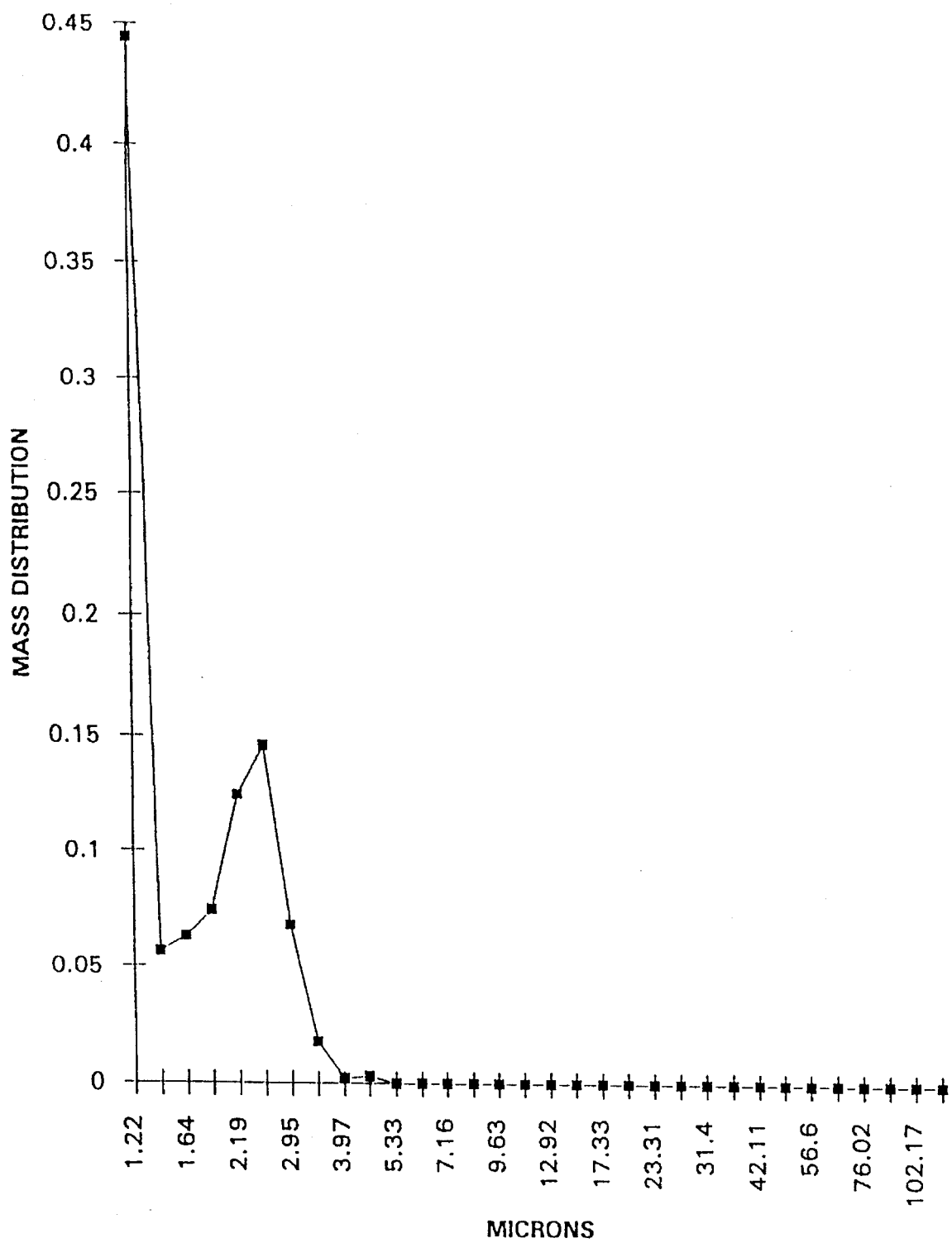
FIGURE 12 - GEL FLUID (SAMPLE #16)

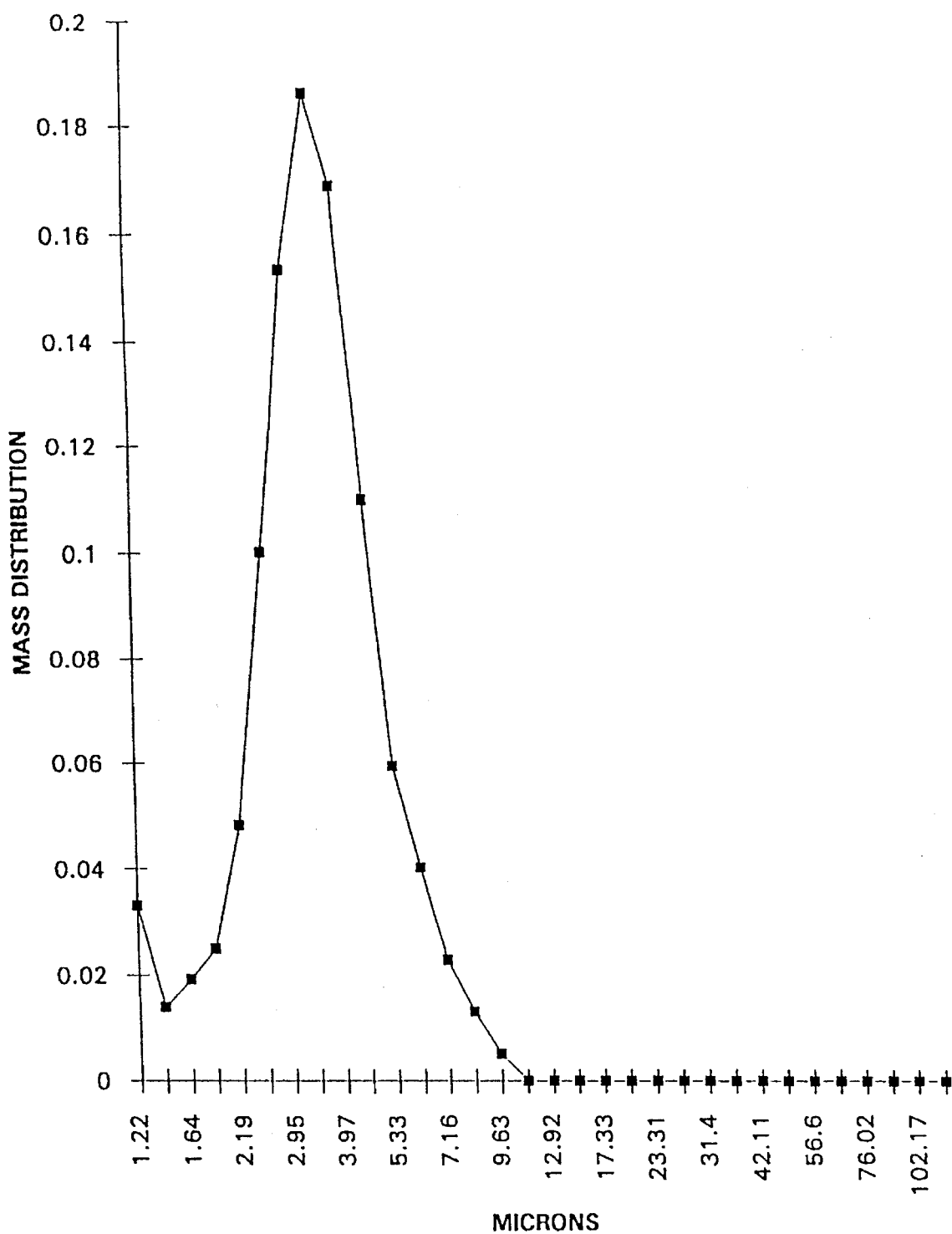
FIGURE 13 - XCD POLYMER FLUID (SAMPLE #17-CONTROL)

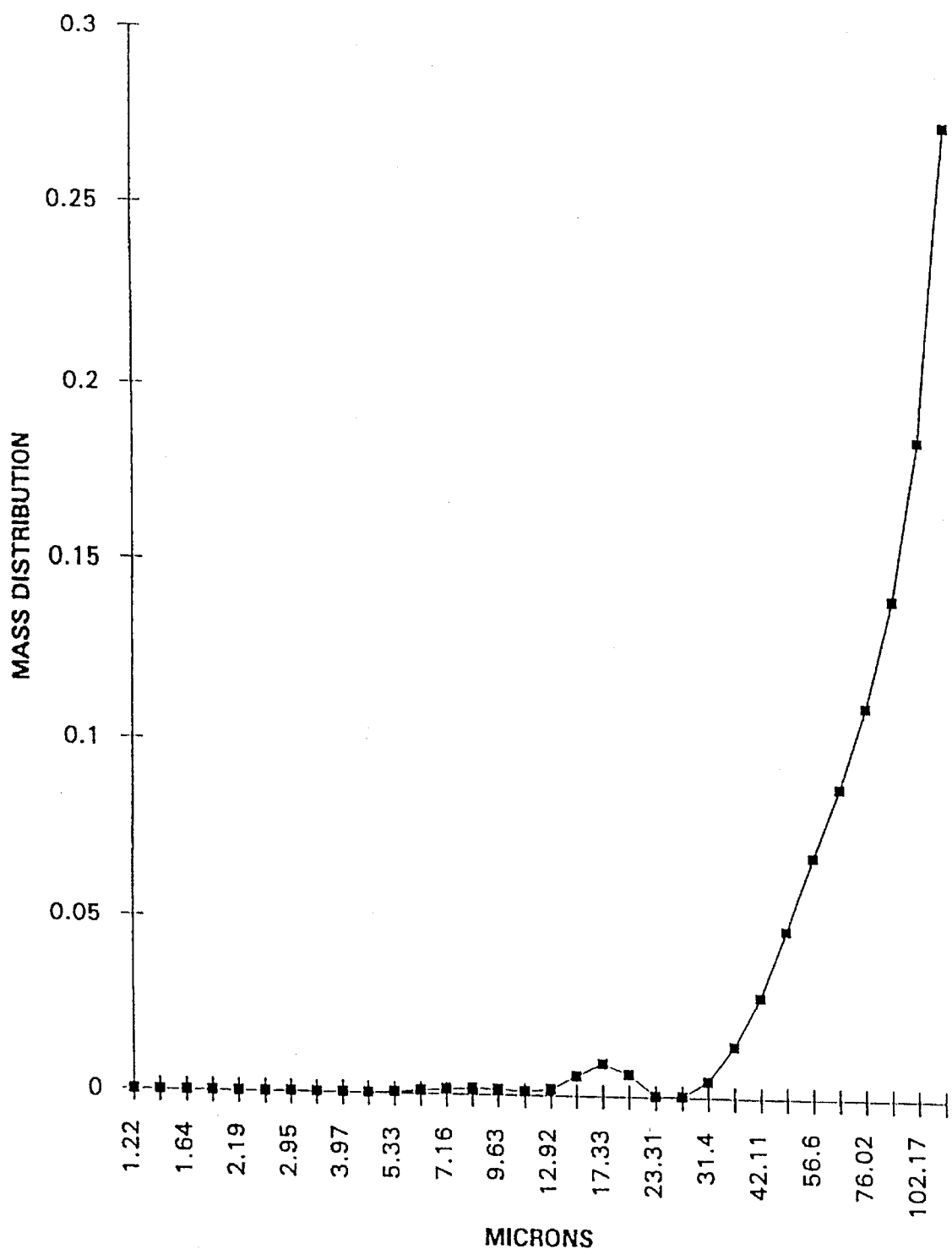
FIGURE 14 - XCD POLYMER FLUID (SAMPLE #18)

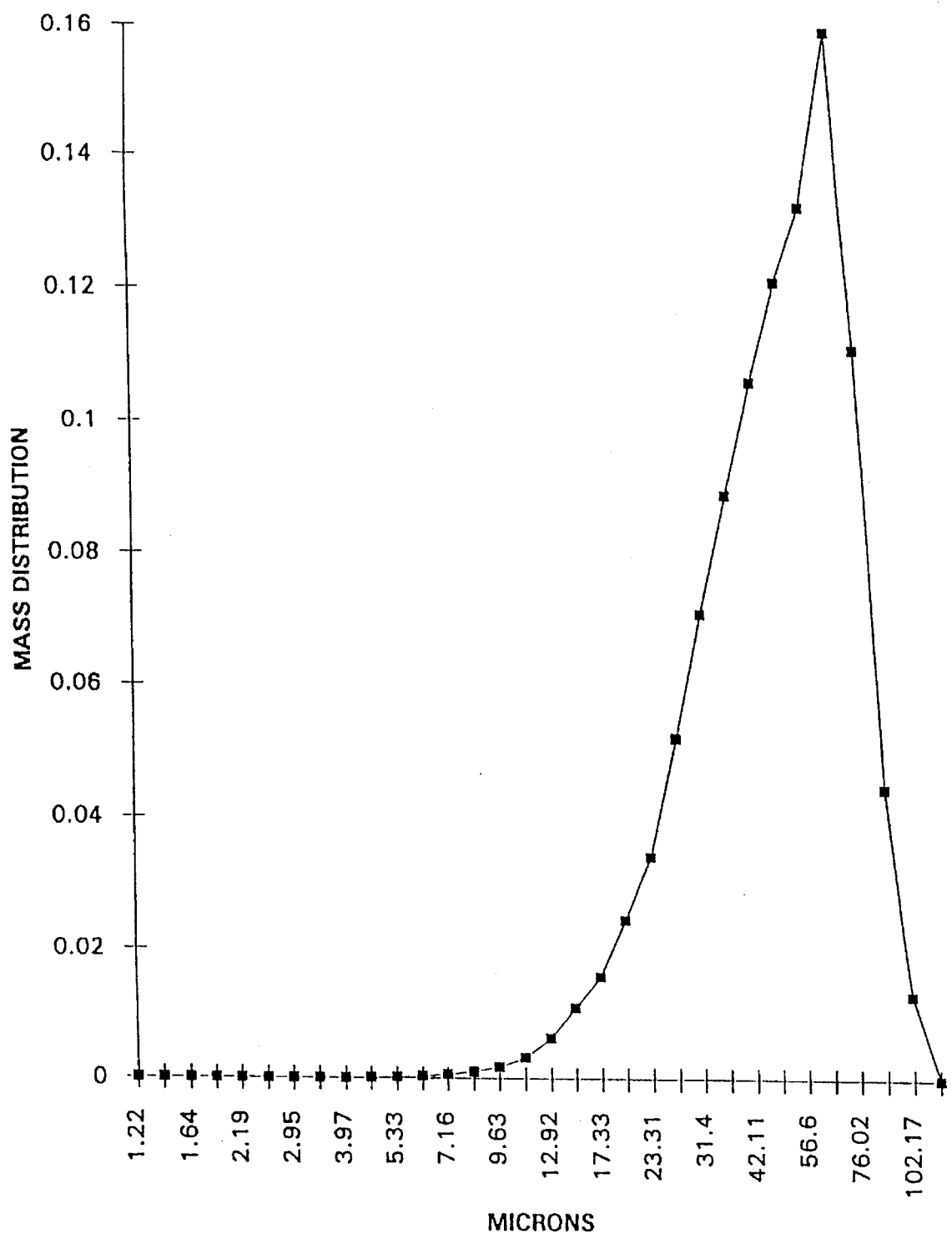
FIGURE 15 - XCD POLYMER FLUID (SAMPLE #19)

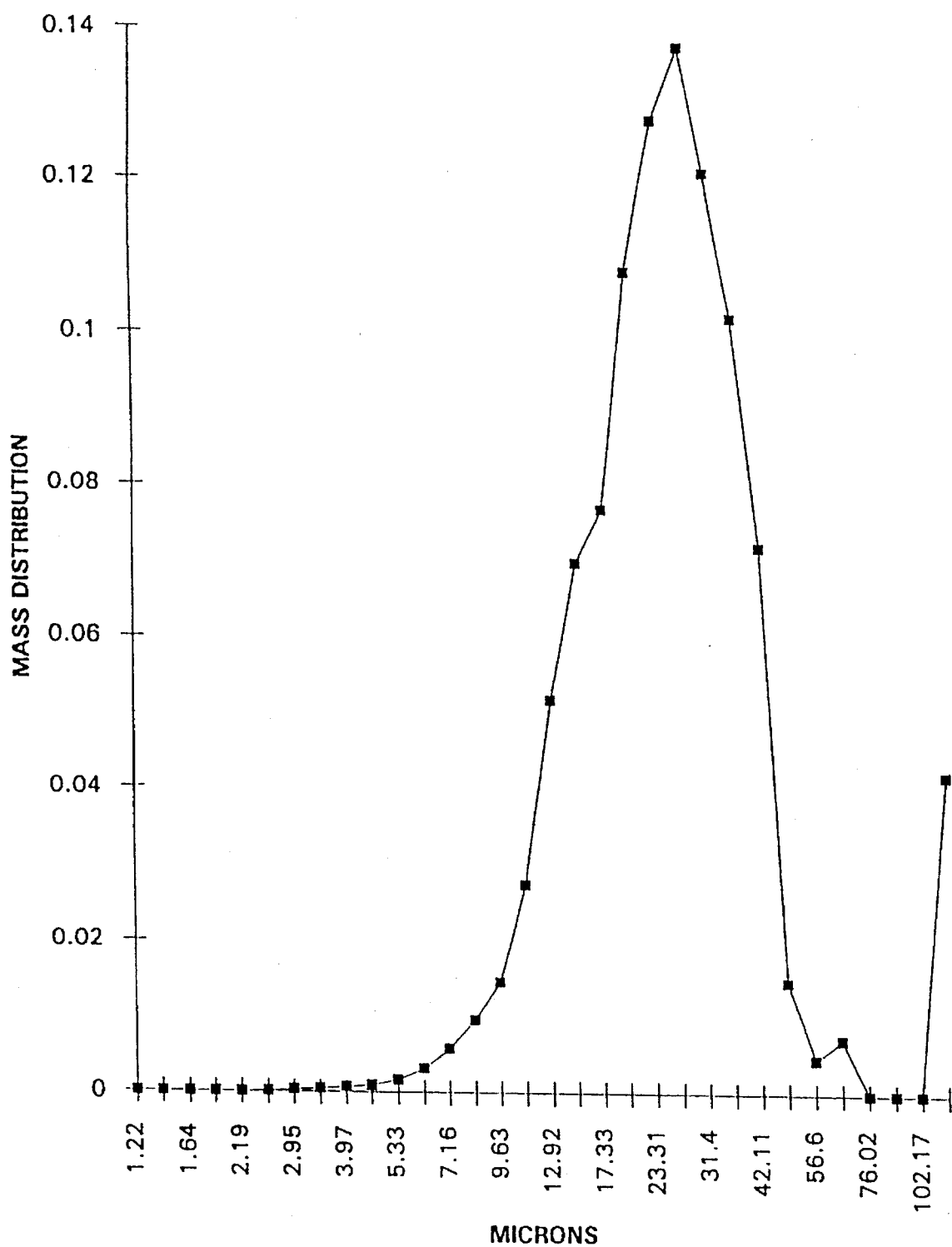
FIGURE 16 - XCD POLYMER FLUID (SAMPLE #20)

SOLID-LIQUID SEPARATION PROCESS USING AT LEAST ONE POLYMER AND CAVITATION ENERGY

This application is a continuation application of application Ser. No. 08/126,155, filed on Sep. 23, 1993, and now abandoned.

FIELD OF THE INVENTION

The invention relates generally to a process for the separation of solids from an aqueous fluid containing one or more polymers. More specifically, but not by way of limitation, the invention relates to a process for separating fine solids from such a fluid by applying acoustic energy to the fluid at a level sufficient to induce cavitation within the fluid.

BACKGROUND OF THE INVENTION

In the drilling of oil and gas wells by the rotary method, aqueous drilling liquids, commonly called "muds" are used during drilling operations to facilitate removal of the dislodged formation particles from the borehole back to the surface, to lubricate the bit, to maintain wellbore integrity, and to assist in controlling formation pressure. Drilling muds usually consist of a mixture of clays, chemicals, and water or oil, all of which are carefully formulated for the particular well/formation being drilled. During drilling operations, the mud is circulated down through the drill string, out the drill bit at the lower end of the drill string, and then up through the annular space between the drill string and the borehole to the earth's surface. The mud which is returned to the surface from the wellbore will contain cuttings produced in the drilling process (especially clay) and may also contain various substances that have been added to give it the desired chemical and physical properties. As a result, it is typically treated at the surface to maintain the correct consistency and other make-up characteristics before being recirculated back down into the wellbore.

It is important that excess solids be removed from the drilling mud because accumulation of these solids can increase drilling costs by slowing down the rate of penetration of the drill bit and by creating logging and other problems such as loss circulation and stuck pipe. As described further below, the common solution to the problem of solids build-up has been to set up sometimes elaborate and costly solids control systems to remove the drill solids from the drilling fluid at the surface. The costs of the drilling mud along with the associated maintenance costs can account for a significant portion of the costs of drilling a well.

With conventional solids removal processes, the mud passes through various types of equipment (such as screen shakers, hydrocyclones and centrifuges) to remove unwanted solids. The problem with these devices is that they are limited to the size of particles which can be separated. The drill solids from the wellbore will range from several millimeters to submicron in size (1 micron=1/25,000 inch). The larger solids (particles having diameters greater than about 20 microns) are typically removed by screen shakers and gravitational separation devices such as hydrocyclones and decanting centrifuges. However, many of the ultra-fine particles (particles having diameters in the range of about 4 to about 44 microns) and the majority of the colloidal particles (particles having diameter less than about 3 microns) will continue to circulate and disperse through the system unless special solids-removal equipment or chemical treatment processes are used.

To remove solids below about 20 microns in diameter, coagulants and flocculants can be added to muds prior to separation with a centrifuge. These chemically enhanced centrifugation ("CEC") processes aggregate the fine particles, which allows them to be more easily separated from the fluid by centrifugation. Coagulants that have been used include aluminum, iron, and calcium salts. Flocculants that have been used include copolymers of acrylamide, which can be cationic, nonionic and anionic. The fluid recovered by centrifugation is returned as needed to the mud system and the separated solids are discharged as waste.

One of the problems with CEC processes is that residue chemicals in the returning effluent may have undesirable effects on mud properties (e.g., poor filtration properties due to flocculation of bentonite clay). This type of process also involves sometimes significant chemical and labor costs. Another significant problem is that these processes will produce very wet solids discharges (typically, about nine barrels of drilling fluid are discarded for each barrel of drill solids removed). Drilling rigs in some cases produce up to about two barrels of liquid waste for every foot of hole drilled. Thus, drilling operations can generate large quantities of waste. Due to increasing environmental concerns and escalating waste treatment and disposal costs, there is growing incentive to reduce the volume of drilling wastes. As a result, the effectiveness of a solids control system for drilling operations can be measured not only by the amount of solids removed from the treated mud, but also by the amount of water in the solids that are removed. Ideally, the solids control system will remove all drilled solids from the treated mud and the removed solids will be essentially dry.

Although not used in the current technology covering separation of solids from a drilling mud, acoustic energy at an intensity below cavitation level has been used in techniques to separate a dispersed phase from a fluid: The application of acoustic energy below cavitation level to a fluid containing a dispersed phase has been used in the biomedical field for blood cell agglomeration, industrial aerosol dust removal, and in unit operations for solid/liquid separation. In these instances, acoustic energy applied to the fluid at an intensity below cavitation level has been shown to cause agglomeration of particles (having a neutral surface charge) in the fluid. Once the smaller particles have agglomerated, it is much easier to then separate the larger agglomerations from the fluid. With each of these applications, it is clear that the intensity level of the acoustic energy applied to the fluid must not be at or above cavitation level because cavitation has been shown to cause particles to degrade or break-up into even smaller sizes, rather than to agglomerate.

One of the conditions responsible for the agglomeration effect of acoustic energy applied to a fluid at an intensity below cavitation level is thought to be the resulting existence of a standing wave in the fluid. The suspended denser particles in the fluid migrate towards pressure node positions located along the standing wave. It is thought that secondary forces such as particle oscillation and Bernoulli force are used to bring about particle-particle collisions and eventually particle aggregation at these pressure nodes. The problem with this approach as applied to separation of fine solids from a typical gel or polymer drilling mud is that no agglomeration, and thus no enhanced separation, will occur in the absence of significant quantities of chemical additives: The drilled solids in drilling muds returned from the wellbore will typically have a negative surface charge. As a result, when acoustic energy below cavitation is applied to the fluid, the particle-particle collisions at pressure nodes of the standing wave will not result in particle agglomeration because the particles having like surface charges will repel each other. To ensure agglomeration, chemical coagulants would need to be added prior to separation. As described previously, the same problems associated with addition of chemicals to the drilling fluid will exist: A very wet solids discharge will be obtained, and there may be undesirable effect on the recycled effluent due to residual chemicals.

Acoustic energy above cavitation level has been harnessed and applied in atomization of liquid, bonding of plastic and metal, cleaning (ultrasonic bath), increasing the activity of metal catalysts, and fusing metal particles, as described in "Scaling Up Ultrasonically Enhanced Processes", Senapati, Ultrasonic International 89 Conference Proceedings, p. 236—243. The effects of cavitation arise from the physical processes that create, enlarge and implode gaseous and vaporous cavities in a liquid. Intense ultrasonic waves generate large alternating stresses within a liquid by creating regions of positive and negative pressure. When a cavity reaches a critical size, the cavity implodes, generating intense heat and tremendous pressure. The shock waves created by the implosion of the cavities has been shown to drive small nickel and zinc particles into one another at speeds of more than 500 kilometers per hour; these collisions were so intense and violent that localized melting took place in the metal particles at the points of impact. However, as previously stated, the application of acoustic energy above cavitation level has been avoided in processes for the separation of dispersed particles from a fluid because the effect of the implosions of cavities and resulting shock waves has been to degrade or disperse the particles to even smaller sizes, rather than to agglomerate the particles.

To summarize, chemically enhanced centrifugation processes and/or the application of acoustic energy below cavitation level may be useful in removing fine solids from drilling fluids. However, there is a substantially unfilled need for an improved process for removing ultra-fine and colloidal solids from the drilling fluids without adding any, or any significant quantities of, coagulants and/or flocculants and without a resulting wet discharge. Furthermore, although this discussion has focused on the problems associated with removal of solids from drilling fluids, it is likely that many similar problems will occur in other solid/liquid separation processes, such as those associated with waste water treatment. The various embodiments of the inventive process described below may be useful in handling solid/liquid separation in such other processes other than solid separation from drilling muds.

SUMMARY OF THE INVENTION

The present invention relates to a process for separating fine solids from an aqueous fluid containing at least one polymer. The fluid is flowed into a vessel and acoustic energy is applied to the fluid at an intensity level sufficient to induce cavitation within the fluid. The fine solids are allowed to agglomerate in at least one position within the vessel, and the agglomerated solids are then separated from the fluid.

In one embodiment of the invention, the fluid is a drilling mud having a polymer mud additive selected from the group consisting of xanthan gums (such as XC or its dispersible form XCD), cellulose HP-007, and PHPA (partially-hydrolyzed polyacrylamide) extending polymer. Acoustic energy is applied at a level sufficient to induce cavitation within the fluid. The agglomerated fine solids can then be separated from the fluid with conventional techniques such as centrifugation. The diameter of each of the fine solids agglomerated will typically be no greater than about 20 microns.

It is believed that the effect of cavitation alters the make-up of polymers by changing the configurations and/or chemical properties of the polymers. For an XCD polymer, it is thought that the effect of the cavitation energy is to unravel the xanthan molecules of the polymer and thus open active sites which have a great attraction for clay solids. The solids are captured at the active sites of the denatured xanthan molecule strands and thereby agglomerate at one or more positions within so the vessel. A PHPA polymer is solids-active and adsorbs extensively on the surfaces of drilling cuttings. Because PHPA forms an adsorbed layer around drill cuttings, the cuttings are less degraded as they rise up from the wellbore to the surface. It is thought that cavitation may alter the network (e.g., configuration and/or chemical properties) of some of the PHPA molecules, and thus enhance the activity of these molecules, which enhances or allows them to function as a coagulant/flocculant to remove fine solids in the suspension.

BRIEF DESCRIPTION OF THE DRAWINGS

The advantages of one embodiment of the present invention will be better understood by referring to the following detailed description and the attached drawings related to application of the inventive process to separation of solids from a drilling mud:

FIGS. 5–16 are graphs of mass distribution versus particle size diameter (microns) obtained from particle size analyses performed on a gel and polymer fluid.

DETAILED DESCRIPTION OF THE PREFERRED EMBODIMENTS

This invention is generally applicable to any process for separating fine solids from an aqueous fluid containing one or more polymers. A polymer is defined generally as a substance made of giant molecules formed by the union of simple molecules so (monomers). The polymer could be part of a slurry (solid liquid mixture), added to a slurry, or generated from the slurry. The practice of one embodiment of this invention is illustrated by a method to remove fine solids from an aqueous drilling fluid, or mud, which contains a polymeric mud additive and typically contains suspended solids such as bentonite clays and suspended earth formation solids. However, it should be understood that the invention should not be unduly limited to the application and can be used and modified, if necessary, by one skilled in the art to provide or enhance separation of solid particles from a fluid containing at least one polymer using acoustic energy applied at or above cavitation level.

Figure 1:
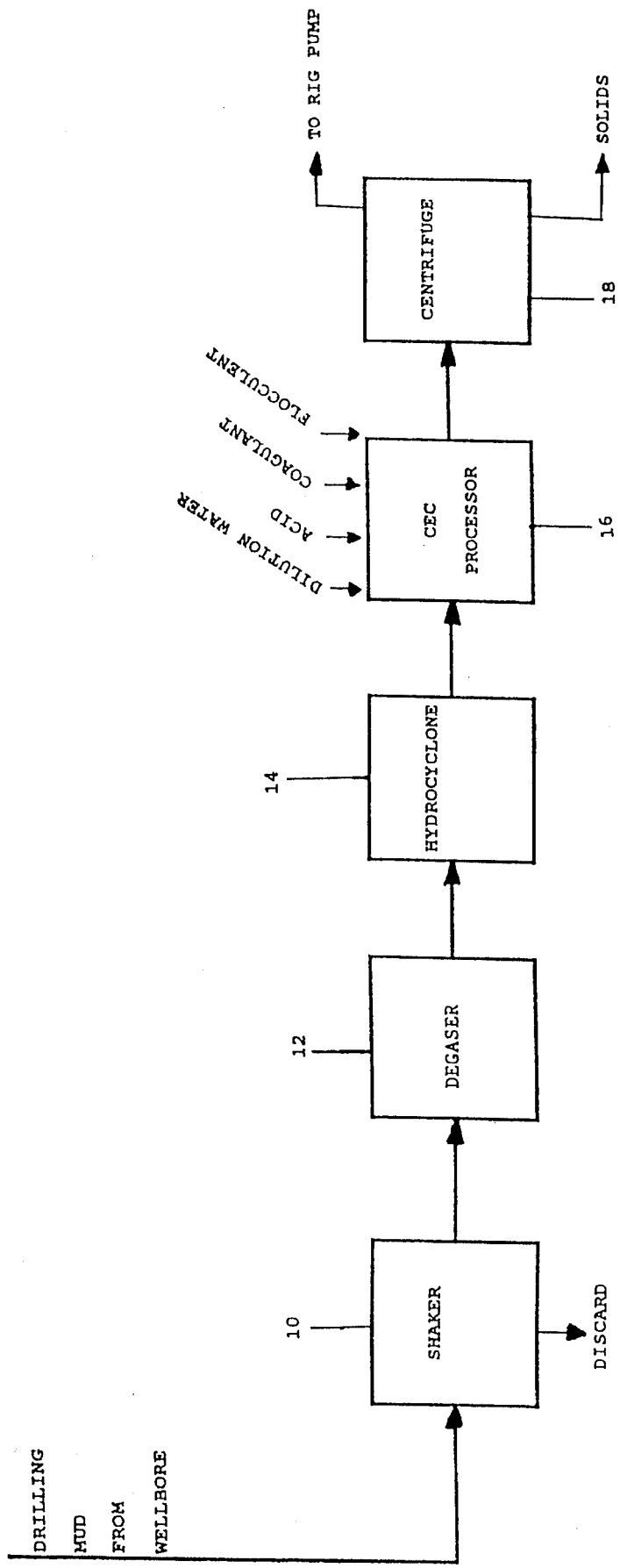
FIG. 1 is a block flow diagram which illustrates conventional steps and associated equipment used in removing solids from a drilling mud.

FIG. 1 illustrates the conventional steps and associated equipment used in removing solids from a drilling mud. In conventional drilling operations, the drilling mud which is returned to the surface from the wellbore is flowed into screen shakers 10 to remove very course solid particles, typically greater than about 300 microns in diameter. The fluid is then flowed into a degasser 12 where trapped gases and air are removed. Hydrocyclones 14 (desanders and desilters) are used to remove solid particles which are typically greater than about 20 microns in size. The mud is then processed in a CEC unit 16 using conventional coagulants and flocculants which will agglomerate the fine particles having diameters in the range of about 20 microns or less. The agglomerated fine particles are then separated in centrifuge 18 and removed through the underflow discharge, while the overflow effluent is then returned to the mud pit or used in dilution water. As previously indicated the problems associated with this process include a very wet solids discharge and the undesirable effects that the residue chemicals in the returning effluent may have on the mud properties.

Figure 2:
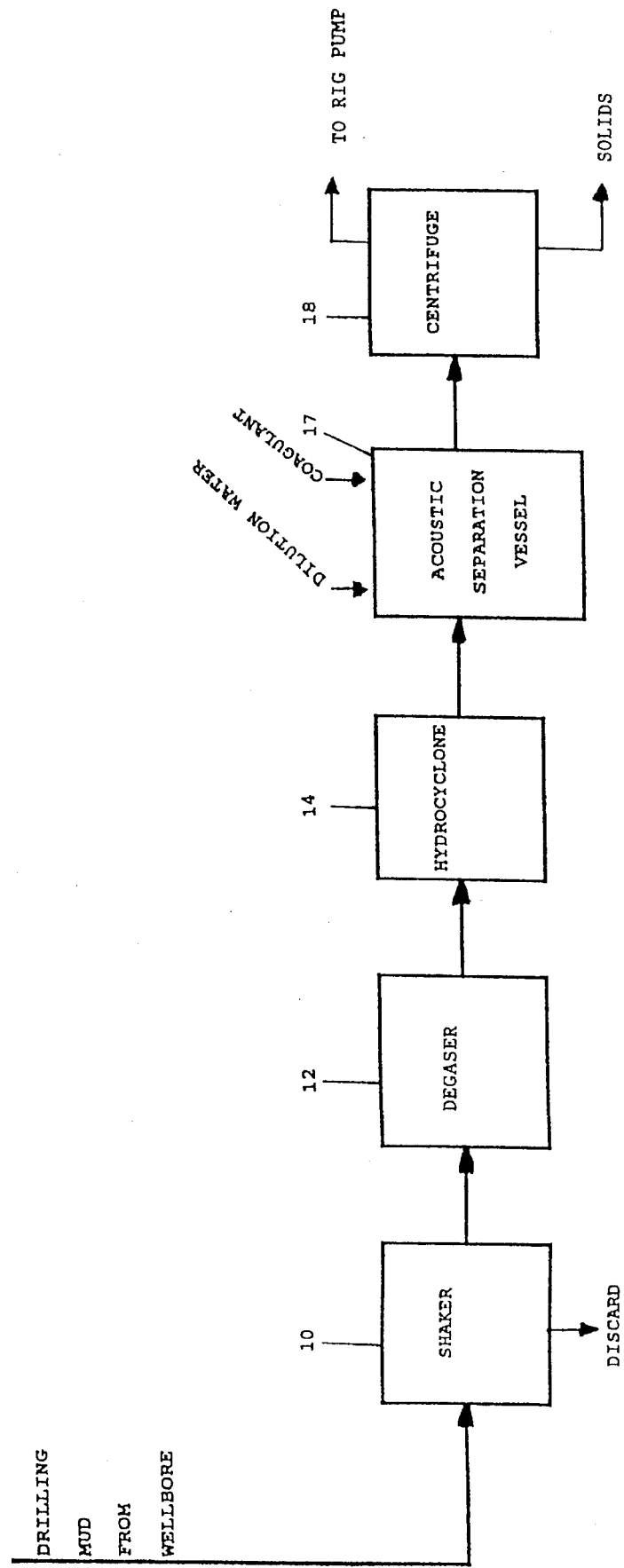
FIG. 2 is a block flow diagram which illustrates a process for removing solids from a drilling fluid which uses one embodiment of the inventive method of the present invention.

Referring now to FIG. 2, in one embodiment of this invention, the drilling fluid is passed through shakers 10, degasser 12, and hydrocyclones 14, but instead of using chemical coagulants or flocculants to remove the fine solids (less than about 20 microns in diameter), the drilling fluid is flowed into an acoustic separation vessel 17, which is equipped to apply acoustic energy to the fluid at an intensity level sufficient to induce cavitation within the fluid. The vessel could be a typical separation vessel, such as a cylindrical chamber, but it could also be a flow pipe equipped to apply acoustic energy (e.g., retrofitted with acoustic horns). The equipment necessary to apply the acoustic energy will be apparent to those skilled in the art, and for example could consist of an amplifier, signal generator, piezoelectric transducer, and acoustic horns, etc. The acoustic energy is applied a sufficient amount of time to allow at least a portion of the fine solids to agglomerate in at least one position within the vessel. The treatment time can be determined through sample testing by one skilled in the art, but typically will range from about 30 seconds to about 180 seconds. For each fluid, one needs to try different treatment times. The optimal treatment of course, is the minimal time required to agglomerate all solids in the vessel. The agglomerated fine solids are then separated from the drilling fluid using centrifuge 18. The resultant discharge of agglomerated solids will be relatively dry: Field observations range from 20 wt. % to about 40 wt. %. A CEC discharge is considered dry if it is 40 or above.

There is a large variety of polymers that can be used in drilling fluids: materials that are deflocculants, filtration control products, viscosifers, and gel extenders are all polymers. As used in describing this embodiment for the application of the invention to drilling fluid, a fluid containing a polymer includes, but is not limited to, a drilling fluid where polymer products provide some or all of the carrying capacity and suspension properties of the fluid. By this definition we are referring to drilling fluids that use small, medium, and large molecular weight polymers. Two examples of large molecular weight polymers added to drilling fluids are viscosifiers and extenders. These polymer products either completely substitute for clay in the fluid or work on an equal basis with the clay of a traditional water-base drilling fluid. Drilling fluids with one of the above characteristics are typically either (1) all-polymer fluids, where all the carrying capacity and suspension is provided by large molecular weight products, such as the biogum XC and the cellulosic HP-007, or (2) polymer-extended fluids, where the PHPA extending polymer works with a lesser concentration of clay to provide viscosity and suspension. These polymers will not adversely affect mud properties because they are compatible with most muds. These polymers commonly used in drilling muds may also be added to wastes that do not contain such polymers or sufficient amounts of such polymers.

Figure 3:
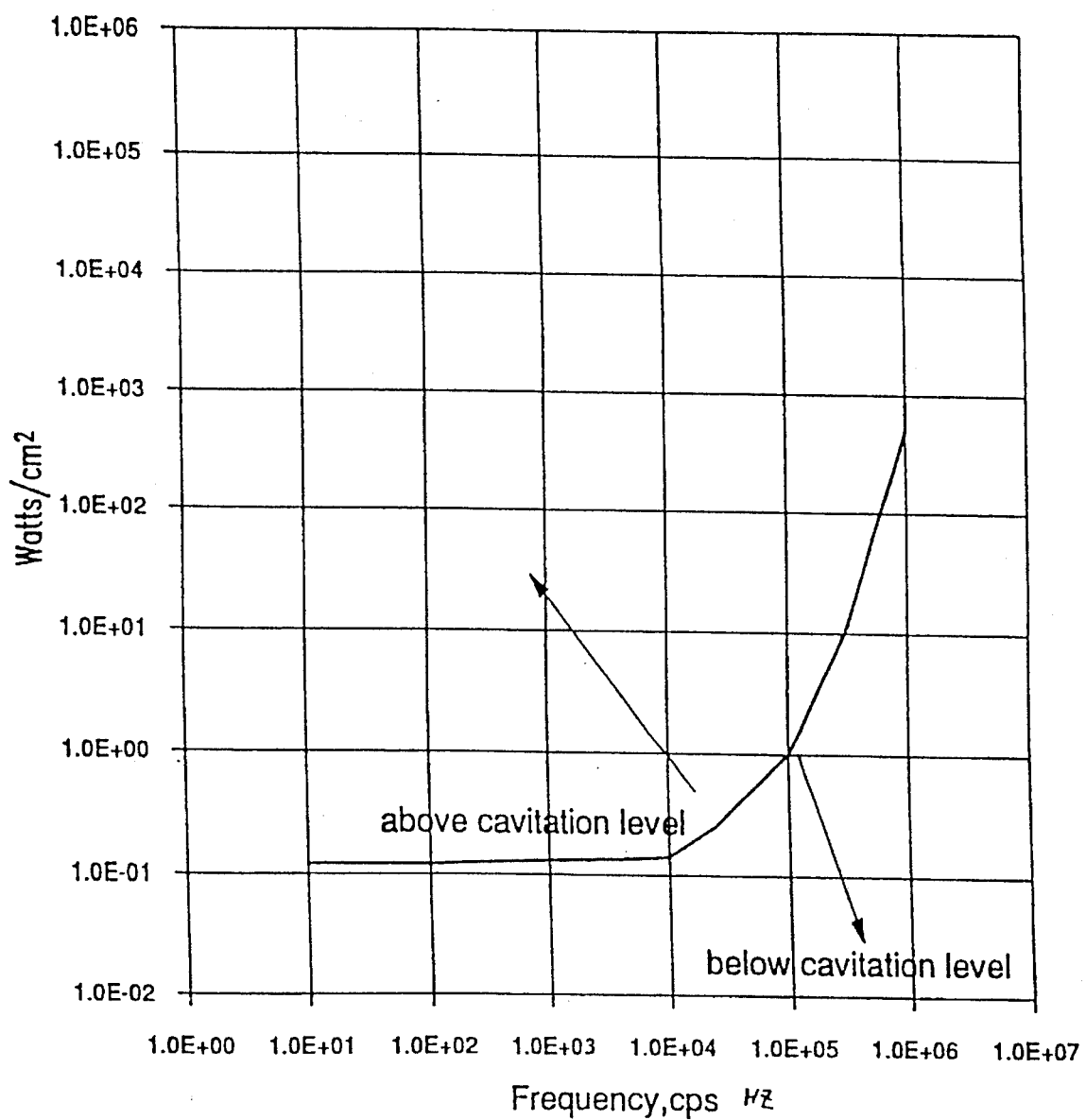
FIG. 3 is a graph which illustrates the dependence of the intensity on frequency required to produce cavitation in water.

FIG. 3 illustrates the dependence of the intensity (Watts/$cm^2$) on the frequency (kHZ) required to produce cavitation for water. The intensity and frequency used to induce cavitation and obtain optimum agglomeration of fine particles within a fluid is dependent on the types of liquid phase and the amount of trapped gas and air in the liquid. It is important that the sonication not be too high in order to avoid the degradation of the larger particles. The optimum intensity and frequency required can be determined through laboratory experiments by one skilled in the art and will depend on the specifics of the application (such as the types of fluid, solids, and trapped air or gas). To induce cavitation and obtain optimum agglomeration for the drilling fluids tested, it is preferred that the intensity used be in the range of about 20 Watts/$cm^2$ to about 50 watts/$cm^2$ and the frequency be in the range of about 20 kHZ to about 100 kHZ depending on the specifics of the application (such as the types of fluids, solids, and trapped air or gases).

It is preferred that chemical coagulants and/or or flocculants also be added to enhance the agglomeration of fine particles. However, unlike typical CEC processes, the amount of coagulants/flocculants added is minimal, and as a result, the negative effects of such chemicals (e.g., very wet solids removed and the negative effects of chemicals on the drilling mud) are minimized. As described further in the examples, coagulant concentrations in the 500–1000 ppm range were sufficient to enhance particle agglomeration in the polymer-based drilling fluids tested. In conventional CEC processes, in addition to adding flocculant in concentration of about 300–1000 ppm, a coagulant in concentrations of 4000 to 10,000 ppm are commonly used to neutralize negatively charged particles and thus facilitate the flocculation step. It is also important that the drilling mud be diluted prior to sonication in order to enhance solids separation because field experience has shown that solids separation decreases with increasing solids concentration. For drilling muds, the preferred dilution ratio is a ratio which gives a fine solids concentration in the feed of about 5 wt. %. For other applications, the dilution, if necessary, will depend on the specifics of the application.

The invention may be better understood by reference to the following examples which are offered only as illustrative embodiments of the invention as applied to solids removal from a drilling fluid, and they are not to be limited or restrictive thereof.

LABORATORY EXPERIMENTS

Figure 4:
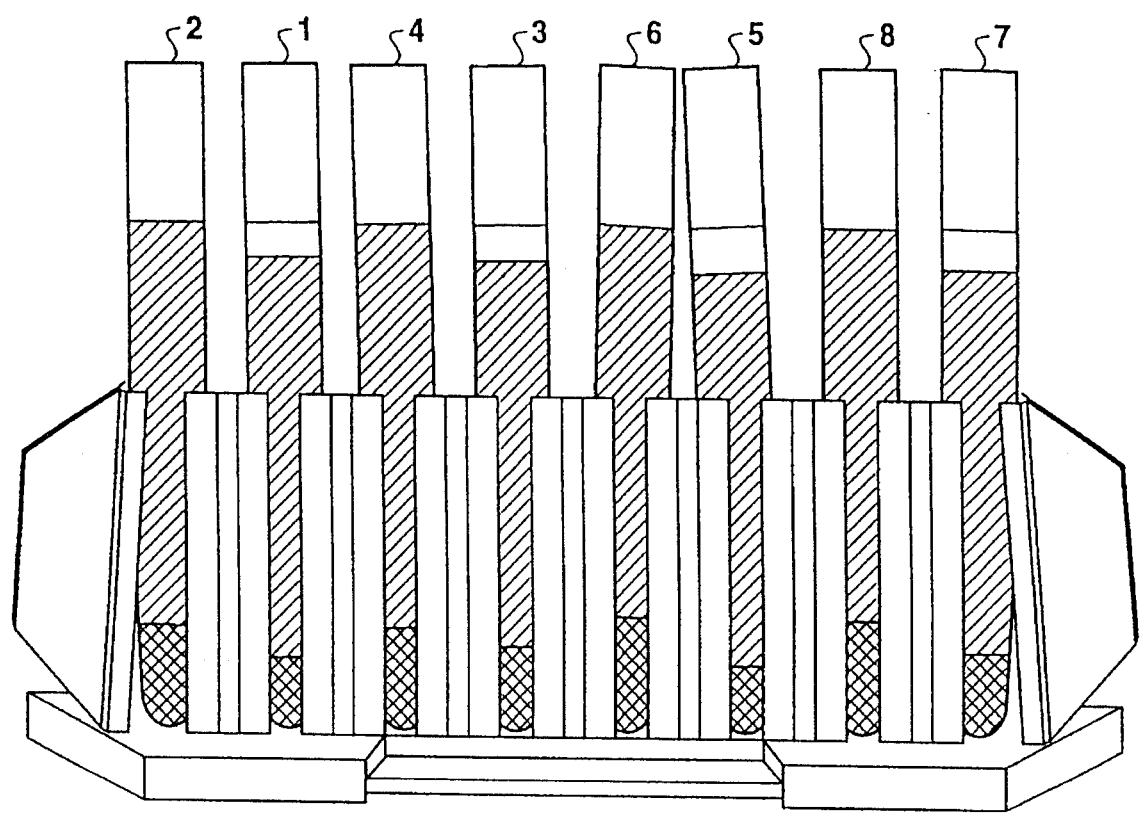
FIG. 4 is illustrates the agglomeration of fine particles in a polymer fluid exposed to acoustic energy above cavitation.

Acoustic energy above cavitation level was applied to agglomerate fine solids in polymer drilling fluids such as PHPA, XCD, and non polymer gel fluids. Contrary to the conventional belief that cavitation energy disperses or degrades solids and reduces solids removal efficiency, water-based polymer fluid samples (PHPA and XCD) (Examples 1–8) treated with acoustic energy above cavitation level (>60 watt/$cm^2$) were found to give a clean liquid layer in the absence of a coagulant. FIG. 4 illustrates the differences for the PHPA mud exposed to acoustic intensity of 79 W/$cm^2$ (tubes 1, 3 sonicated for 60 seconds; tubes 5, 7 sonicated for 90 seconds; tubes 2, 4, 6, 8 are control samples): With the addition of a coagulant (1–3 wt % Fe$_2$(SO$_4$)$_3$), the volume of clear liquid on top of the test tube 1, 3, 5 and 7 increased, where test tubes 2, 4, 6 and 8 are controls. For both the PHPA and XCD mud, a dry cake discharge with 40 wt % solids is obtained. As can be seen in FIG. 4, the samples of the treated PHPA mud have a far greater liquid layer than the control, yet have less larger particles then the control (as indicated by the bottom fraction). These results suggested that smaller colloids are being agglomerated while the larger particles are being broken up by cavitation. As previously discussed, it is therefore necessary to ensure that the intensity applied is not too high.

Further experiments using particle size measurement techniques verified the agglomeration effect described above. The results of testing of the XCD polymer (Samples 17–20) subjected to acoustic treatment above cavitation level resulted in an increase in the mean particle size of the solids in the fluid. Acoustic energy above cavitation was also applied to gel fluids (no polymer added; samples 9–16) and resulted in dispersal or degradation of the solids, but no agglomeration occurred. These results suggest that the fusion effect of cavitation energy is not responsible for agglomeration of solids in fluids, but that the combination of cavitation energy and polymer is responsible. In addition, a small amount of coagulant or flocculant can be added to enhance solid/liquid separation.

A total of 20 samples were tested. Samples 1–8 consisted of a PHPA polymer extended mud. Samples 9–16 consisted of a gel fluid (no polymer) and samples 17–20 consisted of a XCD polymer mud.

SAMPLE PREPARATION

The PHPA samples (1–8) tested were prepared in the following manner:

0–1000 ppm of 5 wt. % Fe$_2$(SO$_4$)$_3$ was added to the PHPA slurry

The slurry was then exposed to a acoustic energy treatment at an intensity greater than 60 Watt/cm$^2$.

The sonicated suspension was spun down at 130 g for 5 minutes.

The volume of the clear liquid layer and the volume of the solids were used to assess particle agglomeration.

The gel and polymer samples (9–16 & 17–20, respectively) tested were prepared in the following manner:

A 5 wt. % Fe$_2$(SO$_4$)$_3$ coagulant from stock solution was prepared.

The polymer or gel slurry was diluted to a given solids concentration (i.e. 1:1 or one vol water: one vol slurry) with water.

100 ml of diluted slurry was measured into a clean beaker.

The 5 wt. % Fe$_2$(SO$_4$)$_3$ solution was added slowly to the dilute slurry with a disposable plastic syringe. The volume of coagulant required to de stabilize the slurry ranged from 0 ml to 8 ml. The concentration of inorganic coagulants in the slurry was less than 1000 ppm and the solids concentration was typically less than 5 wt. %

The slurry was then exposed to a sonication treatment at an intensity greater than 20 watt/cm$^2$ for an exposure time of 60 seconds or greater.

The sonicated suspension was spun down at 1200 g for 3 minutes (start to end).

The supernatant was collected for particle size analysis and solids analysis and the bottom cake pellet was collected and the percent solids was determined.

TESTING PROCEDURES

Samples 1–8 (PHPA Polymer)

These concentrated samples were first treated with 0–1000 ppm Fe$_2$(SO$_4$)$_3$. A high intensity ultrasonic processor (VC 300 with a ⅛" tapered tip and a VC 60 with a stepped microtip) from Vibra-Cell were used in these experiments to convert 50/60 Hz voltage to high frequency 20 kHz electrical energy. The electrical energy was transmitted to the piezoelectric transducer within the converter, where it was changed to mechanical vibration. The vibrations from the converter were intensified by the horn, creating pressure waves in the liquid. Sediment volume from an IEC centrifugation (130 g for 5 min) was used to asses particle agglomeration.

Samples 9–21 (gel fluid #9–16; XCD polymer #17–20)

These samples were first diluted with distilled water and treated with inorganic coagulants and cavitation energy. The coagulant used was 0.0 ml to 8.0 ml of 5 wt % Fe$_2$(SO$_4$)$_3$ solution. To reach cavitation, acoustic energy was applied at an acoustic frequency of 20 kHz and at an acoustic intensity greater than 20 watts/cm$^2$. The supernatant were then harvested through centrifugation and subsequent particle size analysis were performed. A Malvern Particle Size Analyzer was used to obtain particle sizing information for sonicated samples (XCD and Gels).

RESULTS

SAMPLES 1–8 (PHPA POLYMER MUD)

For PHPA polymer extended mud, sonication at intensities greater than 100 W/cm$^2$ for 60 and 600 seconds gave a far greater clear liquid layer than the control; yet, these samples have less larger particles than the control, as indicated by the bottom solids fraction (see FIG. 3). These results suggest that smaller colloids are being agglomerated while the larger particles are being broken up by cavitation. This indicates that this process is applicable to agglomeration of solids having a diameter less than 20 microns. Also, it indicates the need to for care in determining the intensity level to apply. In this case an intensity of 79 watt/cm2 is too violent and will generate a lot of fine solids. When the identical procedures were carried out for Gel-CLS mud, no enhanced solid-liquid separation was observed between the control and treated samples.

Samples 9–16 (Gel Fluid; No Polymer Added)

As previously discussed, ultrasonic energy above cavitation level has been demonstrated to disperse or degrade solids due to the implosion of gaseous bubbles in the liquid medium. This was demonstrated in the testing of the gel fluids. The mean particle size for the gel fluid decreased following chemical/acoustic acoustic treatment (tests no. 9–16). For example, the cumulative particle count less than 1.22 microns in particle diameter increases from 56.9% (control sample #22) to 76.9% (#23) following sonication above cavitation level. The solids capture ranged from about 73% to about 80%, and the cake solids content in the discharge was about 40 wt. %. Table 1 below gives a comparison of the cumulative particle count with and without acoustic treatment above cavitation. These findings are not surprising and are consistent with the conventional belief that acoustic cavitation degrades or disperses solids in a liquid medium.

TABLE 1

| Sample No. | 5% Coagulant added (gram) | Ultrasonic Treatment | Cumulative Particle Count less than 1.22 microns |
|---|---|---|---|
| 9 (Control) | 0 | No | 68.7 |
| 10 | 5 | No | 56.9 |
| 11 | 5 | Yes | 76.9 |
| 12 | 5 | Yes | 75.4 |
| 13 | 5 | Yes | 78.4 |
| 14 | 3 | Yes | 77.7 |
| 15 | 1 | Yes | 77.9 |
| 16 | 1 | Yes | 78.0 |

Samples 17–20 (XCD Polymer)

Ultrasonic energy above cavitation level was demonstrated in these tests to agglomerate fine solids for the XCD fluid. Particle size analysis of XCD fluid samples subjected to chemical/acoustic treatment indicated increases in mean particle size (tests no. 17–20). For example, the mean diameter of particles in sonicated sample (#19) is 15.02 microns as compared to 1.7 microns in the control (#17). The solids capture ranged from about 90% to about 98%, and the cake solids content was about 40 wt. %. The agglomeration of fine solids in the XCD fluid is further substantiated by visual inspections and the reduction in the population of fine particles with a particle diameter less than 1.22 microns. Table 2 below sets forth a comparison of the cumulative particle count with and without acoustic treatment above cavitation. These findings suggest that it is the synergistic effect of cavitation energy and polymer, not a fusion mechanism, which brings about particle agglomeration. The addition of a small amount of coagulant further enhances separation.

TABLE 2

| Sample No. | 5% Coagulant added | Ultrasonic Treatment | Cumulative Particle Count less than 1.22 microns |
|---|---|---|---|
| 17(Control) | 0 | No | 32.1 |
| 18 | 8 | No | 15.7 |
| 19 | 4 | Yes | 2.48 |
| 20 | 4 | Yes | 4.57 |

The particle size data was collected using a Malvern 3600 EC Particle Sizer. This operation of this instrument is based on the principle of laser ensemble light scattering from the particles entering the light path. The scattered light for each particle is integrated over a range of angles. The intensities from all particles are sorted and correlated with equivalent particle sizes. The information gathered is presented as the number of events detected in a given band size. Detailed operating principles are given in the Malvern Manual.

The particle size data for examples 9–20 is presented in the attached Tables 3–14. The first column gives the particle size in microns. The second column is the number of events picked up by the detector reading in that particular size band. The third column presents the total volume (in cm$^3$) of the particles in a given size band, which is calculated using the following formula:

$$\text{Volume} = 4/3 \pi r^3$$

where r is the particle radius. The fourth column gives the total mass in grams of the particles in a given size band, which is calculated using the following formula:

$$\text{Mass} = \text{Volume} \times \text{Density of solids, where the Density} = 2.4 \text{ g/cc.}$$

The fifth column gives the mass fraction in the size band and is calculated using the following formula:

$$\text{Mass fraction in size band "i"} = \text{mass in size band i/total mass}$$

This information is presented in graphic form in the page immediately following each table. The shifting of the peak towards the left, as compared to the control, means an increase in overall particle size, and the shifting of the peak towards the right means a decrease in overall particle size.

TABLE 3

GEL FLUID (SAMPLE #9-CONTROL)

| Particle Diameter (MICRONS) | Sample #9 % in BAND | VOLUME (cm3) | MASS (grams) | MASS/ TOTAL MASS |
|---|---|---|---|---|
| 1.22 | 68.7 | 6.53183E-11 | 1.56764E-10 | 0.038378728 |
| 1.41 | 6.15 | 9.02674E-12 | 2.16642E-11 | 0.005303796 |
| 1.64 | 4.9 | 1.13169E-11 | 2.71605E-11 | 0.006649393 |
| 1.9 | 4.14 | 1.48682E-11 | 3.56838E-11 | 0.008736058 |
| 2.19 | 4.27 | 2.34833E-11 | 5.63599E-11 | 0.01379795 |
| 2.55 | 3.44 | 2.9866E-11 | 7.16785E-11 | 0.017548231 |
| 2.95 | 1.63 | 2.19105E-11 | 5.25852E-11 | 0.012873837 |
| 3.42 | 0.74 | 1.54992E-11 | 3.7195E-11 | 0.00910677 |
| 3.97 | 0.54 | 1.76915E-11 | 4.24598E-11 | 0.010394884 |
| 4.6 | 0.68 | 3.46562E-11 | 8.31749E-11 | 0.020362766 |
| 5.33 | 0.41 | 3.2506E-11 | 7.80145E-11 | 0.019099405 |
| 6.18 | 0.4 | 4.94338E-11 | 1.18641E-10 | 0.029045561 |
| 7.16 | 1.24 | 2.38319E-10 | 5.71967E-10 | 0.140028071 |
| 8.31 | 1.51 | 4.5371E-10 | 1.0889E-09 | 0.266584179 |
| 9.63 | 0.84 | 3.92787E-10 | 9.42688E-10 | 0.230787615 |
| 11.13 | 0.31 | 2.23793E-10 | 5.37102E-10 | 0.131492669 |
| 12.92 | 0.06 | 6.77544E-11 | 1.62611E-10 | 0.039810089 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.70194E-09 | 4.08466E-09 | 1 |

TABLE 4

GEL FLUID (SAMPLE #10)

| PARTICLE DIAMETER (MICRONS) | Sample #10 % in BAND | VOLUME (cm3) | MASS (grams) | MASS/ TOTAL MASS |
|---|---|---|---|---|
| 1.22 | 56.9 | 5.40991E-11 | 1.29838E-10 | 0.089257982 |
| 1.41 | 11.6 | 1.70261E-11 | 4.08625E-11 | 0.028091222 |
| 1.64 | 8.33 | 1.92387E-11 | 4.61728E-11 | 0.031741822 |
| 1.9 | 4.06 | 1.45809E-11 | 3.49943E-11 | 0.024057037 |
| 2.19 | 3.62 | 1.99085E-11 | 4.77805E-11 | 0.032847038 |
| 2.55 | 3.72 | 3.2297E-11 | 7.75128E-11 | 0.053286695 |
| 2.95 | 3.07 | 4.1267E-II | 9.90408E-11 | 0.068086299 |
| 3.42 | 2.62 | 5.48755E-11 | 1.31701E-10 | 0.090538837 |
| 3.97 | 2.34 | 7.6663E-11 | 1.83991E-10 | 0.126486065 |
| 4.6 | 2.11 | 1.07536E-10 | 2.58087E-10 | 0.177423546 |
| 5.33 | 1.2 | 9.51396E-11 | 2.28335E-10 | 0.156970549 |
| 6.18 | 0.26 | 3.2132E-11 | 7.71167E-11 | 0.053014428 |
| 7.16 | 0.09 | 1.72974E-11 | 4.15137E-11 | 0.028538877 |
| 8.31 | 0.08 | 2.40376E-11 | 5.76903E-11 | 0.039659603 |

TABLE 4-continued

GEL FLUID (SAMPLE #10)

| PARTICLE DIAMETER (MICRONS) | Sample #10 % in BAND | VOLUME (cm3) | MASS (grams) | MASS/ TOTAL MASS |
|---|---|---|---|---|
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 6.06099E-10 | 1.45464E-09 | 1 |

TABLE 5

GEL FLUID (SAMPLE #11)

| Particle Diameter (MICRONS) | sample #11 % in BAND | VOLUME (cm3) | MASS (grams) | MASS/ TOTAL MASS |
|---|---|---|---|---|
| 1.22 | 76.9 | 7.31147E-11 | 1.75475E-10 | 0.434391787 |
| 1.41 | 6.54 | 9.59917E-12 | 2.3038E-11 | 0.057030983 |
| 1.64 | 5.2 | 1.20097E-11 | 2.88234E-11 | 0.071352741 |
| 1.9 | 4.16 | 1.49401E-11 | 3.58562E-11 | 0.088762578 |
| 2.19 | 3.68 | 2.02385E-11 | 4.85725E-11 | 0.120241929 |
| 2.55 | 2.5 | 2.1705E-11 | 5.20919E-11 | 0.128954447 |
| 2.95 | 0.8 | 1.07536E-11 | 2.58087E-11 | 0.063889841 |
| 3.42 | 0.18 | 3.77007E-12 | 9.04817E-12 | 0.022398895 |
| 3.97 | 0.02 | 6.5524E-13 | 1.57258E-12 | 0.003892936 |
| 4.6 | 0.03 | 1.52895E-12 | 3.66945E-12 | 0.009083862 |
| 5.33 | 0 | 0 | 0 | 0 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.68315E-10 | 4.03956E-10 | 1 |

TABLE 6

GEL FLUID (SAMPLE #12)

| PARTICLE DIAMETER (MICRONS) | Sample #12 % in BAND | VOLUME (cm3) | MASS (grams) | MASS/ TOTAL MASS |
|---|---|---|---|---|
| 1.22 | 75.4 | 7.16885E-11 | 1.72052E-10 | 0.392284075 |
| 1.41 | 6.55 | 9.61385E-12 | 2.30732E-11 | 0.052607599 |
| 1.64 | 5.27 | 1.21714E-11 | 2.92114E-11 | 0.066602725 |
| 1.9 | 4.34 | 1.55865E-11 | 3.74076E-11 | 0.085290443 |
| 2.19 | 4.02 | 2.21084E-11 | 5.30601E-11 | 0.120978512 |
| 2.55 | 2.91 | 2.52646E-11 | 6.0635E-11 | 0.138249437 |
| 2.95 | 1.1 | 1.47862E-11 | 3.54869E-11 | 0.080911187 |
| 3.42 | 0.33 | 6.9118E-12 | 1.65883E-11 | 0.037821792 |
| 3.97 | 0.07 | 2.29334E-12 | 5.50401E-12 | 0.012549297 |
| 4.6 | 0.03 | 1.52895E-12 | 3.66948E-12 | 0.008366515 |
| 5.33 | 0.01 | 7.9283E-13 | 1.90279E-12 | 0.004338419 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.82746E-10 | 4.38591E-10 | 1 |

TABLE 7

GEL FLUID (SAMPLE #13)

| PARTICLE DIAMETER (MICRONS) | sample #13 % in BAND | VOLUME (cm3) | MASS (grams) | MASS/ TOTAL MASS |
|---|---|---|---|---|
| 1.22 | 78.4 | 7.45408E-11 | 1.78898E-10 | 0.466309537 |
| 1.41 | 6.45 | 9.46707E-12 | 2.2721E-11 | 0.059223735 |
| 1.64 | 4.85 | 1.12014E-11 | 2.68833E-11 | 0.070073212 |
| 1.9 | 3.7 | 1.3288E-11 | 3.19913E-11 | 0.08312684 |
| 2.19 | 3.42 | 1.88086E-11 | 4.51407E-11 | 0.117662262 |
| 2.55 | 2.36 | 2.04895E-11 | 4.91748E-11 | 0.12817735 |
| 2.95 | 0.71 | 9.54384E-12 | 2.29052E-11 | 0.05970396 |
| 3.42 | 0.12 | 2.51338E-12 | 6.03211E-12 | 0.015723105 |
| 3.97 | 0 | 0 | 0 | 0 |
| 4.6 | 0 | 0 | 0 | 0 |
| 5.33 | 0 | 0 | 0 | 0 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |

TABLE 7-continued

GEL FLUID (SAMPLE #13)

| PARTICLE DIAMETER (MICRONS) | sample #13 % in BAND | VOLUME (cm3) | MASS (grams) | MASS/ TOTAL MASS |
|---|---|---|---|---|
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.59853E-10 | 3.83646E-10 | 1 |

TABLE 8

GEL FLUID (SAMPLE #14)

| PARTICLE DIAMETER (MICRONS) | Sample #14 % in BAND | VOLUME (cm3) | MASS (grams) | MASS/ TOTAL MASS |
|---|---|---|---|---|
| 1.22 | 77.7 | 7.38753E-11 | 1.77301E-10 | 0.447323988 |
| 1.41 | 6.48 | 9.5111E-12 | 2.28267E-11 | 0.057590921 |
| 1.64 | 4.96 | 1.14554E-11 | 2.74931E-11 | 0.069364123 |
| 1.9 | 3.84 | 1.37908E-11 | 3.3098E-11 | 0.083505235 |
| 2.19 | 3.5 | 1.92486E-11 | 4.61966E-11 | 0.116552627 |
| 2.55 | 2.47 | 2.14445E-11 | 5.14668E-11 | 0.129849168 |
| 2.95 | 0.85 | 1.14257E-11 | 2.74217E-11 | 0.069184157 |
| 3.42 | 0.17 | 3.56062E-12 | 8.54549E-12 | 0.021560008 |
| 3.97 | 0.01 | 3.2762E-13 | 7.86288E-13 | 0.001983779 |
| 4.6 | 0.01 | 5.0965E-13 | 1.22316E-12 | 0.003085995 |
| 5.33 | 0 | 0 | 0 | 0 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.65149E-10 | 3.96359E-10 | 1 |

TABLE 9

GEL FLUID (SAMPLE #15)

| PARTICLE DIAMETER (MICRONS) | Sample #15 % in BAND | VOLUME (cm3) | MASS (grams) | MASS/ TOTAL MASS |
|---|---|---|---|---|
| 1.22 | 77.9 | 7.40654E-11 | 1.77757E-10 | 0.439149394 |
| 1.41 | 6.42 | 9.42304E-12 | 2.26153E-11 | 0.055871162 |
| 1.64 | 4.76 | 1.09935E-11 | 2.63845E-11 | 0.065182923 |
| 1.9 | 3.62 | 1.30007E-11 | 3.12018E-11 | 0.077084083 |
| 2.19 | 3.48 | 1.91386E-11 | 4.59326E-11 | 0.11347676 |
| 2.55 | 2.58 | 2.23995E-11 | 5.37589E-11 | 0.132811471 |
| 2.95 | 0.95 | 1.27699E-11 | 3.06478E-11 | 0.075715534 |
| 3.42 | 0.21 | 4.39842E-12 | 1.05562E-11 | 0.026079121 |
| 3.97 | 0.02 | 6.5524E-13 | 1.57258E-12 | 0.003885052 |
| 4.6 | 0.02 | 1.0193E-12 | 2.44632E-12 | 0.006043643 |
| 5.33 | 0.01 | 7.9283E-13 | 1.90279E-12 | 0.004700856 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.68657E-10 | 4.04776E-10 | 1 |

TABLE 10

GEL FLUID (SAMPLE #16)

| PARTICLE DIAMETER (MICRONS) | Sample #16 % in BAND | VOLUME (cm3) | MASS (grams) | MASS/ TOTAL MASS |
|---|---|---|---|---|
| 1.22 | 78 | 7.41605E-11 | 1.77985E-10 | 0.444070492 |
| 1.41 | 6.41 | 9.40836E-12 | 2.25801E-11 | 0.056336931 |
| 1.64 | 4.57 | 1.05547E-11 | 2.53313E-11 | 0.063201235 |
| 1.9 | 3.48 | 1.24979E-11 | 2.99951E-11 | 0.074837258 |
| 2.19 | 3.78 | 2.07885E-11 | 4.98924E-11 | 0.124480684 |
| 2.55 | 2.81 | 2.43964E-11 | 5.85513E-11 | 0.146084683 |
| 2.95 | 0.85 | 1.14257E-11 | 2.74217E-11 | 0.068416806 |
| 3.42 | 0.14 | 2.93228E-12 | 7.03746E-12 | 0.017558369 |
| 3.97 | 0.01 | 3.2762E-13 | 7.86288E-13 | 0.001961776 |
| 4.6 | 0.01 | 5.0965E-13 | 1.22316E-12 | 0.003051767 |
| 5.33 | 0 | 0 | 0 | 0 |
| 6.18 | 0 | 0 | 0 | 0 |
| 7.16 | 0 | 0 | 0 | 0 |
| 8.31 | 0 | 0 | 0 | 0 |
| 9.63 | 0 | 0 | 0 | 0 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF THE COLUMNS | | 1.67002E-10 | 4.00804E-10 | 1 |

TABLE 10-continued

GEL FLUID (SAMPLE #16)

| PARTICLE DIAMETER (MICRONS) | Sample #16 % in BAND | VOLUME (cm3) | MASS (grams) | MASS/TOTAL MASS |
|---|---|---|---|---|
| | | COLUMNS | | |

TABLE 11

XCD POLYMER FLUID (SAMPLE #17-CONTROL)

| PARTICLE DIAMETER (MICRONS) | Sample #17 % in BAND | VOLUME (cm3) | MASS (grams) | MASS/TOTAL MASS |
|---|---|---|---|---|
| 1.22 | 32.1 | 3.05199E-11 | 7.32478E-11 | 0.03325243 |
| 1.41 | 8.67 | 1.27255E-11 | 3.05412E-11 | 0.013864854 |
| 1.64 | 7.63 | 1.7622E-11 | 4.22928E-11 | 0.019199722 |
| 1.9 | 6.39 | 2.29488E-11 | 5.50772E-11 | 0.025003483 |
| 2.19 | 8.08 | 4.44368E-11 | 1.06648E-10 | 0.048415293 |
| 2.55 | 10.6 | 9.20291E-11 | 2.2087E-10 | 0.100268672 |
| 2.95 | 10.5 | 1.41141E-10 | 3.38739E-10 | 0.153777999 |
| 3.42 | 8.16 | 1.7091E-10 | 4.10184E-10 | 0.186211858 |
| 3.97 | 4.73 | 1.54964E-10 | 3.71914E-10 | 0.168838513 |
| 4.6 | 1.98 | 1.00911E-10 | 2.42186E-10 | 0.109945521 |
| 5.33 | 0.69 | 5.47053E-11 | 1.31293E-10 | 0.0596032 |
| 6.18 | 0.3 | 3.70754E-11 | 8.89808E-11 | 0.040394807 |
| 7.16 | 0.11 | 2.11412E-11 | 5.0739E-11 | 0.023034066 |
| 8.31 | 0.04 | 1.20188E-11 | 2.88452E-11 | 0.013094892 |
| 9.63 | 0.01 | 4.67603E-12 | 1.12225E-11 | 0.005094689 |
| 11.13 | 0 | 0 | 0 | 0 |
| 12.92 | 0 | 0 | 0 | 0 |
| 15.02 | 0 | 0 | 0 | 0 |
| 17.33 | 0 | 0 | 0 | 0 |
| 20.16 | 0 | 0 | 0 | 0 |
| 23.31 | 0 | 0 | 0 | 0 |
| 27.09 | 0 | 0 | 0 | 0 |
| 31.4 | 0 | 0 | 0 | 0 |
| 36.33 | 0 | 0 | 0 | 0 |
| 42.11 | 0 | 0 | 0 | 0 |
| 48.83 | 0 | 0 | 0 | 0 |
| 56.6 | 0 | 0 | 0 | 0 |
| 65.63 | 0 | 0 | 0 | 0 |
| 76.02 | 0 | 0 | 0 | 0 |
| 88.2 | 0 | 0 | 0 | 0 |
| 102.17 | 0 | 0 | 0 | 0 |
| 118.44 | 0 | 0 | 0 | 0 |
| SUMS OF | THE COLUMNS | 9.17825E-10 | 2.20278E-09 | 1 |

TABLE 12

XCD POLYMER FLUID (SAMPLE #18)

| PARTICLE DIAMETER (MICRONS) | Sample #18 % in BAND | VOLUME (cm3) | MASS (grams) | MASS/TOTAL MASS |
|---|---|---|---|---|
| 1.22 | 15.7 | 1.49272E-11 | 3.58252E-11 | 1.51358E-05 |
| 1.41 | 4.44 | 6.51687E-12 | 1.56405E-11 | 6.60795E-06 |
| 1.64 | 2.88 | 6.65155E-12 | 1.59637E-11 | 6.74451E-06 |
| 1.9 | 0.72 | 2.58578E-12 | 6.20588E-12 | 2.62192E-06 |
| 2.19 | 1 | 5.4996E-12 | 1.3199E-11 | 5.57646E-06 |
| 2.55 | 4.91 | 4.26286E-11 | 1.02309E-10 | 4.32244E-05 |
| 2.95 | 7.76 | 1.0431E-10 | 2.50344E-10 | 0.000105768 |
| 3.42 | 5.46 | 1.14359E-10 | 2.74461E-10 | 0.000115957 |
| 3.97 | 3.85 | 1.26134E-10 | 3.02721E-10 | 0.000127897 |
| 4.6 | 5.17 | 2.63489E-10 | 6.32374E-10 | 0.000267172 |
| 5.33 | 6.84 | 5.42296E-10 | 1.30151E-09 | 0.000549875 |
| 6.18 | 7.85 | 9.70138E-10 | 2.32833E-09 | 0.000983698 |

TABLE 12-continued

XCD POLYMER FLUID (SAMPLE #18)

| PARTICLE DIAMETER (MICRONS) | Sample #18 % in BAND | VOLUME (cm3) | MASS (grams) | MASS/TOTAL MASS |
|---|---|---|---|---|
| 7.16 | 7.66 | 1.4722E-09 | 3.53328E-09 | 0.001492775 |
| 8.31 | 6.08 | 1.82686E-09 | 4.38446E-09 | 0.001852393 |
| 9.63 | 3.37 | 1.57582E-09 | 3.78197E-09 | 0.001597847 |
| 11.13 | 1.65 | 1.19115E-09 | 2.85877E-09 | 0.001207803 |
| 12.92 | 1.56 | 1.76161E-09 | 4.22787E-09 | 0.001786235 |
| 15.02 | 3.1 | 5.50009E-09 | 1.32002E-08 | 0.005576966 |
| 17.33 | 3.33 | 9.07483E-09 | 2.17796E-08 | 0.009201665 |
| 20.16 | 1.44 | 6.17778E-09 | 1.48267E-08 | 0.006264127 |
| 23.31 | 0.06 | 3.97903E-10 | 9.54966E-10 | 0.000403464 |
| 27.09 | 0.03 | 3.12282E-10 | 7.49477E-10 | 0.000316647 |
| 31.4 | 0.28 | 4.53885E-09 | 1.08932E-08 | 0.004602285 |
| 36.33 | 0.57 | 1.4311E-08 | 3.43464E-08 | 0.014511007 |
| 42.11 | 0.72 | 2.81505E-08 | 6.75613E-08 | 0.028543993 |
| 48.83 | 0.78 | 4.75503E-08 | 1.14121E-07 | 0.048214902 |
| 56.6 | 0.72 | 6.83566E-08 | 1.64056E-07 | 0.069311979 |
| 65.63 | 0.59 | 8.73289E-08 | 2.09589E-07 | 0.088549423 |
| 76.02 | 0.48 | 1.10414E-07 | 2.64993E-07 | 0.111957024 |
| 88.2 | 0.39 | 1.4011E-07 | 3.36264E-07 | 0.142068199 |
| 102.17 | 0.33 | 1.84282E-07 | 4.42277E-07 | 0.186857542 |
| 118.44 | 0.31 | 2.69684E-07 | 6.47242E-07 | 0.273453446 |
| SUMS OF | THE COLUMNS | 9.86216E-07 | 2.36692E-06 | 1 |

TABLE 13

XCD POLYMER FLUID (SAMPLE #19)

| PARTICLE DIAMETER (MICRONS) | Sample #19 % in BAND | VOLUME (cm3) | MASS (grams) | MASS/TOTAL MASS |
|---|---|---|---|---|
| 1.22 | 2.48 | 2.35792E-12 | 5.65902E-12 | 1.83778E-06 |
| 1.41 | 0.61 | 8.95335E-13 | 2.14881E-12 | 6.9783E-07 |
| 1.64 | 0.48 | 1.10859E-12 | 2.66062E-12 | 8.64042E-07 |
| 1.9 | 0.31 | 1.11332E-12 | 2.67197E-12 | 8.6773E-07 |
| 2.19 | 0.39 | 2.14484E-12 | 5.14762E-12 | 1.6717E-06 |
| 2.55 | 0.67 | 5.81693E-12 | 1.39606E-11 | 4.53375E-06 |
| 2.95 | 0.91 | 1.22322E-11 | 2.93574E-11 | 9.53385E-06 |
| 3.42 | 1.09 | 2.28299E-11 | 5.47917E-11 | 1.77937E-05 |
| 3.97 | 1.48 | 4.84877E-11 | 1.16371E-10 | 3.77916E-05 |
| 4.6 | 2.21 | 1.12633E-10 | 2.70318E-10 | 8.77866E-05 |
| 5.33 | 3.15 | 2.49742E-10 | 5.9938E-10 | 0.00019465 |
| 6.18 | 3.9 | 4.8198E-10 | 1.15675E-09 | 0.000375658 |
| 7.16 | 4.17 | 8.01445E-10 | 1.92347E-09 | 0.000624651 |
| 8.31 | 4.41 | 1.32507E-09 | 3.18018E-09 | 0.001032771 |
| 9.63 | 4.8 | 2.2445E-09 | 5.38679E-09 | 0.001749373 |
| 11.13 | 5.76 | 4.15821E-09 | 9.97971E-09 | 0.003240935 |
| 12.92 | 7.15 | 8.07406E-09 | 1.93775E-08 | 0.006292973 |
| 15.02 | 7.86 | 1.39454E-08 | 3.3469E-08 | 0.010869127 |
| 17.33 | 7.45 | 2.03025E-08 | 4.87261E-08 | 0.015823927 |
| 20.16 | 7.43 | 3.18756E-08 | 7.65016E-08 | 0.024844068 |
| 23.31 | 6.63 | 4.39682E-08 | 1.05524E-07 | 0.034269097 |
| 27.09 | 6.43 | 6.69324E-08 | 1.60638E-07 | 0.052167534 |
| 31.4 | 5.63 | 9.12633E-08 | 2.19032E-07 | 0.071131121 |
| 36.33 | 4.55 | 1.14237E-07 | 2.74168E-07 | 0.089036874 |
| 42.11 | 3.49 | 1.36452E-07 | 3.27485E-07 | 0.106351463 |
| 48.83 | 2.55 | 1.55453E-07 | 3.73087E-07 | 0.12116095 |
| 56.6 | 1.79 | 1.69942E-07 | 4.07861E-07 | 0.132453867 |
| 65.63 | 1.38 | 2.04261E-07 | 4.90226E-07 | 0.159202035 |
| 76.02 | 0.62 | 1.42618E-07 | 3.42283E-07 | 0.111157201 |
| 88.2 | 0.16 | 5.7481E-08 | 1.37954E-07 | 0.044801036 |
| 102.17 | 0.03 | 1.67529E-08 | 4.0207E-08 | 0.013057311 |
| 118.44 | 0 | 0 | 0 | 0 |
| SUMS OF | THE COLUMNS | 1.28303E-06 | 3.07927E-06 | 1 |

TABLE 14

XCD POLYMER FLUID (SAMPLE #20)

| PARTICLE DIAMETER (MICRONS) | Sample #20 % in BAND | VOLUME (cm3) | MASS (grams) | MASS/ TOTAL MASS |
|---|---|---|---|---|
| 1.22 | 4.57 | 4.34505E-12 | 1.04281E-11 | 2.1049E-05 |
| 1.41 | 0.64 | 9.39368E-13 | 2.25448E-12 | 4.55065E-06 |
| 1.64 | 0.51 | 1.17788E-12 | 2.82691E-12 | 5.70608E-06 |
| 1.9 | 0.34 | 1.22106E-12 | 2.93055E-12 | 5.91529E-06 |
| 2.19 | 0.6 | 3.29976E-12 | 7.91942E-12 | 1.59853E-05 |
| 2.55 | 2.4 | 2.08368E-11 | 5.00082E-11 | 0.000100941 |
| 2.95 | 4.22 | 5.67253E-11 | 1.36141E-10 | 0.000274799 |
| 3.42 | 4.6 | 9.63462E-11 | 2.31231E-10 | 0.000466737 |
| 3.97 | 4.13 | 1.35307E-10 | 3.24737E-10 | 0.000655478 |
| 4.6 | 3.7 | 1.88571E-10 | 4.52569E-10 | 0.000913507 |
| 5.33 | 4.17 | 3.3061E-10 | 7.93465E-10 | 0.0016016 |
| 6.18 | 5.16 | 6.37696E-10 | 1.53047E-09 | 0.00308924 |
| 7.16 | 6.12 | 1.17622E-09 | 2.82293E-09 | 0.005698059 |
| 8.31 | 6.47 | 1.94404E-09 | 4.6657E-09 | 0.009417678 |
| 9.63 | 6.4 | 2.99266E-09 | 7.18239E-09 | 0.014497573 |
| 11.13 | 7.81 | 5.63813E-09 | 1.35315E-08 | 0.027313226 |
| 12.92 | 9.47 | 1.06939E-08 | 2.56654E-08 | 0.051805277 |
| 15.02 | 8.12 | 1.44067E-08 | 3.45761E-08 | 0.069791464 |
| 17.33 | 5.83 | 1.58878E-08 | 3.81306E-08 | 0.07696632 |
| 20.16 | 5.2 | 2.23087E-08 | 5.35408E-08 | 0.108071556 |
| 23.31 | 3.98 | 2.63942E-08 | 6.33461E-08 | 0.127863436 |
| 27.09 | 2.73 | 2.84177E-08 | 6.82024E-08 | 0.137665825 |
| 31.4 | 1.54 | 2.49637E-08 | 5.99128E-08 | 0.120933367 |
| 36.33 | 0.84 | 2.10899E-08 | 5.06157E-08 | 0.10216731 |
| 42.11 | 0.38 | 1.48572E-08 | 3.56574E-08 | 0.071974026 |
| 48.83 | 0.05 | 3.0481E-09 | 7.31543E-09 | 0.014766129 |
| 56.6 | 0.01 | 9.49397E-10 | 2.27855E-09 | 0.004599237 |
| 65.63 | 0.01 | 1.48015E-09 | 3.55236E-09 | 0.007170405 |
| 76.02 | 0 | 0 | 0 | 0 |
| 88.2 | 0 | 0 | 0 | 0 |
| 102.17 | 0 | 0 | 0 | 0 |
| 118.44 | 0.01 | 8.69949E-09 | 2.08788E-08 | 0.042143604 |
| SUMS OF THE COLUMNS | | 2.06425E-07 | 4.9542E-07 | 1 |

As described above, the present invention satisfies the need for a method for separating fine solids from an aqueous fluid containing at least one polymer which minimizes the negative effects of coagulants/flocculants while still obtaining substantially dry removed solids. It should be noted that the invention is not to be unduly limited to the foregoing which has been set forth for illustrative purposes. The process could be easily modified by one skilled in the art to enhance separation of solids/liquid mixture by utilizing polymer(s) and acoustic energy above cavitation. For example, the fluid could be a waste water stream having added a polymeric additive consisting of a copolymer of acrylamides. A smaller amount of polymer (flocculant) could be used to form large flocs from particles previously treated with coagulants. Other modifications and alterations to the invention will be apparent to those skilled in the art without departing from the true scope of the invention, as defined in the following claims.

What I claim is:

1. A process for separating fine solids from an aqueous fluid containing at least one polymer; said process comprising the steps of:

flowing said fluid into a vessel;

applying acoustic energy in said fluid within said vessel at an intensity sufficient to induce cavitation within said fluid; and allowing at least a portion of said fine solids to agglomerate in at least one position within said vessel;

separating said agglomerated solids from said fluid.

2. The process of claim 1 wherein said aqueous fluid is a drilling fluid.

3. The process of claim 1 wherein the size of each of said fine solids is no greater than about 20 microns.

4. The process of claim 1 wherein the step of separating said agglomerated fine solids from said fluid utilizes a centrifuge.

5. The process of claim 1 further comprising the step of adding a chemical coagulant to said fluid prior to application of said acoustic energy to said fluid.

6. The process of claim 1 wherein said polymer is selected from the group consisting of biogum XC, cellulose HP-007, and PHPA extending polymer.

* * * * *